(12) United States Patent
Pham Van et al.

(10) Patent No.: US 12,034,965 B2
(45) Date of Patent: Jul. 9, 2024

(54) MULTIPLE HISTORY BASED NON-ADJACENT MVPS FOR WAVEFRONT PROCESSING OF VIDEO CODING

(71) Applicant: QUALCOMM Incorporated, San Diego, CA (US)

(72) Inventors: Luong Pham Van, San Diego, CA (US); Wei-Jung Chien, San Diego, CA (US); Vadim Seregin, San Diego, CA (US); Marta Karczewicz, San Diego, CA (US); Han Huang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/809,160

(22) Filed: Jun. 27, 2022

(65) Prior Publication Data

US 2022/0329844 A1 Oct. 13, 2022

Related U.S. Application Data

(63) Continuation of application No. 16/506,720, filed on Jul. 9, 2019, now Pat. No. 11,606,575.

(60) Provisional application No. 62/713,944, filed on Aug. 2, 2018, provisional application No. 62/696,281, filed on Jul. 10, 2018.

(51) Int. Cl.
*H04N 19/52* (2014.01)
*H04N 19/15* (2014.01)
*H04N 19/513* (2014.01)
*H04N 19/615* (2014.01)

(52) U.S. Cl.
CPC ............. *H04N 19/52* (2014.11); *H04N 19/15* (2014.11); *H04N 19/521* (2014.11); *H04N 19/615* (2014.11)

(58) Field of Classification Search
None
See application file for complete search history.

(56) References Cited

U.S. PATENT DOCUMENTS

| 5,379,070 A | 1/1995 | Retter et al. |
| 8,204,104 B2 | 6/2012 | Matsubayashi |
| (Continued) | | |

FOREIGN PATENT DOCUMENTS

| CN | 101159837 A | 4/2008 |
| WO | 2017197126 A1 | 11/2017 |

OTHER PUBLICATIONS

Taiwan Search Report—TW108124384—TIPO—dated Nov. 14, 2022, 1 Page.

(Continued)

*Primary Examiner* — Clifford Hilaire
(74) *Attorney, Agent, or Firm* — Shumaker & Sieffert, P.A.

(57) ABSTRACT

An example device for coding video data includes a memory configured to store video data; and one or more processing units implemented in circuitry and configured to: store motion information for a first coding tree unit (CTU) line of a picture in a first history motion vector predictor (MVP) buffer of the memory; reset a second history MVP buffer of the memory; and after resetting the second history MVP buffer, store motion information for a second CTU line of the picture in the second history MVP buffer, the second CTU line being different than the first CTU line. Separate threads of a video coding process executed by the one or more processors may process respective CTU lines, in some examples.

30 Claims, 18 Drawing Sheets

(56) References Cited

U.S. PATENT DOCUMENTS

| | | | |
|---|---|---|---|
| 9,319,657 | B2 | 4/2016 | Kang et al. |
| 9,699,456 | B2 | 7/2017 | Chien et al. |
| 9,918,098 | B2 | 3/2018 | Eckart et al. |
| 10,491,902 | B1 | 11/2019 | Xu et al. |
| 11,095,909 | B2 | 8/2021 | Abe et al. |
| 2007/0211801 | A1 | 9/2007 | Matsubayashi |
| 2013/0170549 | A1 | 7/2013 | Li et al. |
| 2013/0182769 | A1 | 7/2013 | Yu et al. |
| 2013/0336405 | A1 | 12/2013 | Chen et al. |
| 2015/0016503 | A1 | 1/2015 | Rapaka et al. |
| 2015/0271531 | A1 | 9/2015 | Wen et al. |
| 2015/0304665 | A1 | 10/2015 | Hannuksela et al. |
| 2015/0341674 | A1 | 11/2015 | Seregin et al. |
| 2016/0344903 | A1 | 11/2016 | Zhou |
| 2017/0208335 | A1 | 7/2017 | Ramamurthy et al. |
| 2017/0238001 | A1 | 8/2017 | Li et al. |
| 2017/0310990 | A1 | 10/2017 | Hsu |
| 2018/0020228 | A1 | 1/2018 | Wu et al. |
| 2018/0146208 | A1 | 5/2018 | Hojati et al. |
| 2018/0359483 | A1 | 12/2018 | Chen et al. |
| 2019/0082191 | A1 | 3/2019 | Chuang et al. |
| 2019/0327482 | A1 | 10/2019 | Lin et al. |
| 2020/0014917 | A1 | 1/2020 | Xu et al. |
| 2020/0014948 | A1 | 1/2020 | Lai et al. |
| 2020/0021839 | A1 | 1/2020 | Pham Van et al. |
| 2021/0136405 | A1 | 5/2021 | Chen et al. |

OTHER PUBLICATIONS

Amonou I., et al., "Description of Video Coding Technology Proposal by France Telecom, NTT, NTT DOCOMO, Panasonic and Technicolor," ITU-T SG16 WP3 and ISO/IEC JTCI/SC29NVG11, Document JCTVC-A114, Dresden, DE, Apr. 15-23, 2010, 42 pp.

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bossen F., "Common Test Conditions and Software Reference Configurations", Joint Collaborative Team on Video Coding (JCT-VC) of ITU-T SG16 WP3 and ISO/IEC JTC1/SC29/WG11, JCTVC-E700 WG11 No. m20235, 4th Meeting: Daegu, KR, Jan. 20-28, 2011, 11 Pages.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.

Chen J., et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 Pages.

Chen Y., et al., "Description of SDR, HDR and 360° Video Coding Technology Proposal by Qualcomm and Technicolor-Low and High Complexity Versions", 10th JVET Meeting, San Diego, US, Apr. 10-20, 2018 (Oct. 4, 2018-Apr. 20, 2018), The Joint Video Exploration Team (JVET) of ISO/IEC JTC 1/SC 29/WG 11 and ITU-T SG 16 WP 3), URL: http://phenix.int-evry.fr/jvet, No. JVET-J0021-v5, Apr. 14, 2018 (Apr. 14, 2018), XP030151184, pp. 1-43.

Chen Y-W., et al., "CE4-Related: Modified History-Based MVP to Support Parallel Processing", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0106, pp. 1-3.

Chien W., et al., "CE8-related: CPR mode Signaling and Interaction with Inter Coding Tools", JVET-M0483, Joint Video Experts Team (JVET) of ITU-T SG 16 WP 3 and ISO/IEC JTC 1/SC 29/WG 11, JVET-M0483, 13th Meeting: Marrakech, MA, Jan. 9-18, 2019, pp. 1-6.

Clare, et al., "Wavefront and Cabac Flush: Different Degrees of Parallelism Without Transcoding," Source: Orange Labs, JCTVC-F275, ITU-T SG16 WP3 and ISO/IEC JTC1/SC29/WG11, 6th Meeting: Torino, IT, Jul. 14-22, 2011, 11 pages, URL: http://wftp3.itu.int/av-arch/jctvc-site/, (Jul. 15, 2011), No. JCTVC-F275, XP030009298.

Clare, et al., "Wavefront Parallel Processing for HEVC Encoding and Decoding," JCTVC-F274, Source: Orange Labs, ITU-T SG16 WP3 and ISO/IEC JTC1/SC29/WG11, 6th Meeting: Torino, IT, Jul. 14-22, 2011, 16 pages.

Coban M., "Cross check report of JCTVC-F274 Wavefront Parallel Processing", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F588, 5 pages.

Drugeon V., "Cross-check of JCTVC-F274 from Orange Labs", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F527, 3 pages.

Ergen S., "ZigBee/IEEE 802.15.4 Summary", Sep. 10, 2004, 37 Pages.

"Euclidean Distance," Wikipedia, Accessed on Apr. 14, 2018, accessed from https://en.wikipedia.org/wiki/Euclidean_distance, 4 pp.

Guo X., et al., "Ordered Entropy Slices for Parallel CABAC," [online], ITU—Telecommunications Standardization Sector Study Group 16 Question 6,May 2, 2009 Document: VCEG-AK25, Dec. 21, 2015, URL :http://wftp3.itu.int/av-arch/video-site/0904_Yok/VCEG-AK25.zip , 4 pages.

Han Y., et al., "CE4.2.3: Improvement on Merge/Skip mode", Joint Video Exploration Team (JVET) of ITU-T SG 16 WP 3 and ISO/IEC JTC 1/SC 29/WG 11, JVET-K0339, 11th Meeting: Ljubljana, SI, Jul. 10-18, 2018, 7 pages.

Henkel A., "Cross-check of Orange Lab's Wavefront Parallel Processing for HEVC Encoding and Decoding JCTVC-F274", JCTVC-F486, Joint Collaborative Team on Video Coding (JCT-VC); of ITU-T SG16 WP3 and ISO/IEC JTC1/SC29/WG11; 6th Meeting: Torino, IT, Jul. 14-22, 2011, 2 pages.

Henry F., et al., "Wavefront Parallel Processing", 5. JCT-VC Meeting; 97. MPEG Meeting; Mar. 16, 2011-Mar. 23, 2011; Geneva,CH, Joint Collaborative Team on Video Coding (JCT-VC) of ITU-T SG16 WP3 and ISO/IEC JTC1/SC29/WG11 No. m19714, JCTVC-E196, Mar. 16, 2011, 9 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Preliminary Report on Patentability—PCT/US2019/041241, The International Bureau of WIPO—Geneva, Switzerland, dated Jan. 21, 2021, 15 pp.

International Search Report and Written Opinion—PCT/US2019/041241—ISA/EPO—dated Oct. 9, 2010, 22 pp.

ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.

"L1", Wikipedia, Retrieved from the Internet: https://en.wikipedia.org/wiki/L1, 2019, 3 pages.

Lin J-L., et al., "Motion Vector Coding in the HEVC Standard", IEEE Journal of Selected Topics in Signal Processing, vol. 7, No. 6, Dec. 2013, pp. 957-968.

Misra K., et al., "Periodic Initialization for Wavefront Coding Functionality", JCTVC-D073, Joint Collaborative Team on Video

(56) References Cited

OTHER PUBLICATIONS

Coding (JCT-VC) of ITU-T SG16 WP3 and ISO/IEC JTC1/SC29/WG11, 4th Meeting: Daegu, KR, Jan. 20-28, 2011, pp. 1-7.
Misra K., et al., "Lightweight Slicing for Entropy Coding", 4. JCT-VC Meeting, 95. MPEG Meeting, Jan. 20, 2011-Jan. 28, 2011, Daegu, KR, (Joint Collaborative Team on Video Coding (JCT-VC) of ISO/IEC JTC1/SC29/WG11 and ITU-T SG.16 WP3), URL: http://wftp3.itu.int/av-arch/jctvc-site/, No. JCTVC-D070, Jan. 16, 2011 (Jan. 16, 2011), pp. 1-7, XP030008110, ISSN: 0000-0015.
Park N., et al., "CE4-related: History-Based Motion Vector Prediction considering parallel processing", 12th JVET Meeting; Oct. 3, 2018-Oct. 12, 2018; Macao; (The Joint Video Exploration Team of ISO/IEC JTC1/SC29/WG11 and ITU-T SG.16), No. JVET-L0158, Sep. 24, 2018, XP030193687, Retrieved from the Internet: URL: http://phenix.int-evry.fr/jvet/doc_end_user/documents/12_Macao/wg11/JVET-L0158-v1.zip JVET-L0158.docx [retrieved on Sep. 24, 2018], 6 pages.
Radicke S., et al., "A Multi-Threaded Full-Feature HEVC Encoder based on Wavefront Parallel Processing", In 2014 International Conference on Signal Processing and Multimedia Applications (SIGMAP), Aug. 2, 20148, pp. 90-98, IEEE, Year: 2014, 9 Pages.
Sullivan G., et al., "Meeting Report of the 13th meeting of the Joint Video Experts Team (JVET)", Marrakech, MA, Jan. 9-18, 2019, JVET-M_Notes_d5, 234 pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191, http://dx.doi.org/10.1109/TCSVT.2012.2221191, https://ieeexplore.ieee.org/stamp/stamp.jsp?%20arnumber=6316136).
Sze et al., "Massively Parallel CABAC," Document VCEG-AL21, 38th Meeting: London, UKI Geneva, CH, Jul. 1-8, 2009, 10 pp.
Sze V., et al., "Analysis of Entropy Slices Approaches", Joint Collaborative Team on Video Coding (JCT-VC) of ITU-T SG16 WP3 and ISO/IEC JTC1/SC29/WG11, JCTVC-D243, 4th Meeting: Daegu, KR, Jan. 20-28, 2011, 6 pages.
Sze V., et al., "High Efficiency Video Coding (HEVC) Algorithms and Architectures", in Integrated Circuits and Systems, New York, NY, USA, Springer International Publishing, Verlag, Jan. 1, 2014, 384 pages, XP55263413, ISBN: 978-3-319-06894-7.
Wang F., et al., "OpenCL Based High-Quality HEVC Motion Estimation on GPU", In 2014 IEEE International Conference on Image Processing (ICIP), Oct. 2, 20147, pp. 1263-1267.
Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.
Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Zhang L., et al., "CE4-Related: History-Based Motion Vector Prediction", Joint Video Experts Team (JVET) of ITU-T SG 16 WP 3 and ISO/IEC JTC 1/SC 29/WG 11, 11th Meeting, Ljubljana, SI, Jul. 10-18, 2018, JVET-K0104-v1, 5 pages.
Zhang L., et al., "History-Based Motion Vector Prediction in Versatile Video Coding", 2019 Data Compression Conference (DCC), IEEE, Mar. 26, 2019, pp. 43-52, XP033548557, DOI: 10.1109/DCC.2019.00012 [retrieved on May 10, 2019] Section 3; figures 3,4.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

FIG. 8

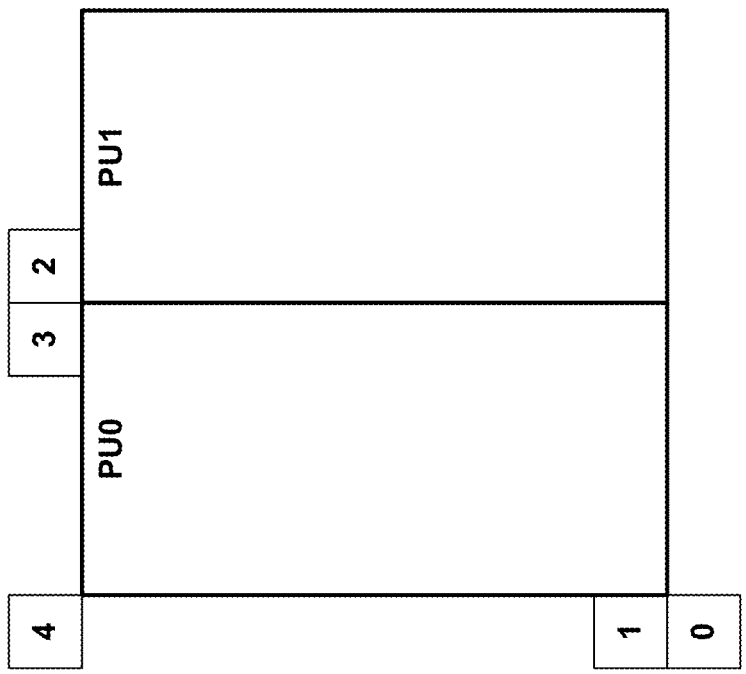
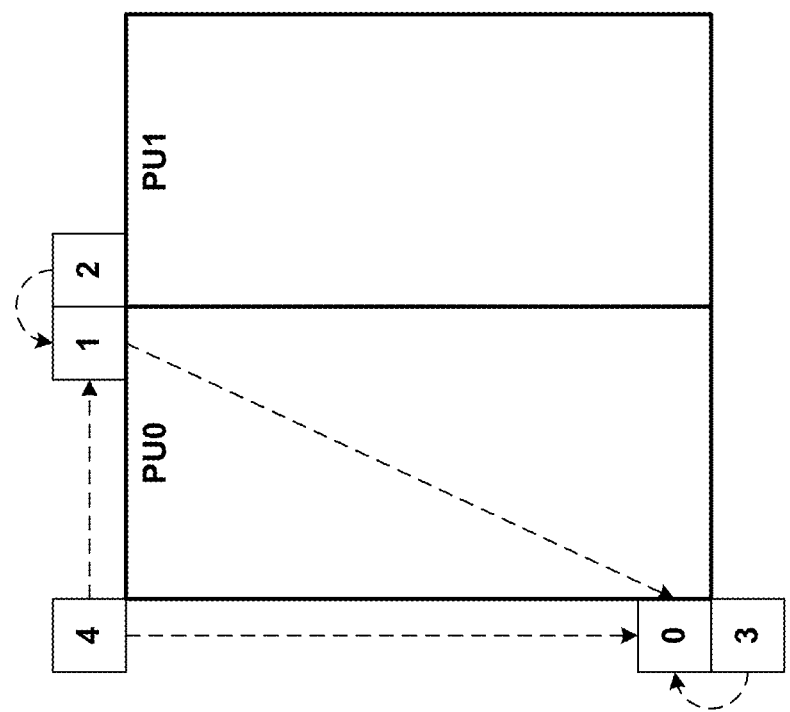
FIG. 10B
FIG. 10A

MULTIPLE HISTORY BASED NON-ADJACENT MVPS FOR WAVEFRONT PROCESSING OF VIDEO CODING

This application is a continuation of U.S. patent application Ser. No. 16/506,720, filed Jul. 9, 2019, which claims the benefit of U.S. Provisional Application No. 62/696,281, filed Jul. 10, 2018, and of U.S. Provisional Application No. 62/713,944, filed Aug. 2, 2018, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding motion information of blocks of video data. These techniques may be used during wavefront parallel processing. The motion information may include motion vectors that are predicted from history motion vector predictors (HMVPs). An HMVP candidate may refer to motion information of a previously coded block. A video coder (encoder or decoder) may maintain a table with multiple HMVP candidates during a coding (encoding or decoding) process. The video coder may empty the table when a new slice occurs. When there is an inter-coded block, the video coder may append motion information associated with the inter-coded block to the table.

In one example, a method of coding (encoding or decoding) video data includes storing motion information for a first coding tree unit (CTU) line of a picture in a first history motion vector predictor (MVP) buffer of a memory; resetting a second history MVP buffer of the memory; and after resetting the second history MVP buffer, storing motion information for a second CTU line of the picture in the second history MVP buffer, the second CTU line being different than the first CTU line. In some examples, a first thread of a video coding process may code the first CTU line and a second thread of the video coding process, different than the first thread, may code the second CTU line.

In another example, a device for coding video data includes a memory configured to store video data; and one or more processing units implemented in circuitry and configured to: store motion information for a first coding tree unit (CTU) line of a picture in a first history motion vector predictor (MVP) buffer of the memory; reset a second history MVP buffer of the memory; and after resetting the second history MVP buffer, store motion information for a second CTU line of the picture in the second history MVP buffer, the second CTU line being different than the first CTU line.

In another example, a computer-readable storage medium has stored thereon instructions that, when executed, cause a processor to: store motion information for a first coding tree unit (CTU) line of a picture in a first history motion vector predictor (MVP) buffer of a memory; reset a second history MVP buffer of the memory; and after resetting the second history MVP buffer, store motion information for a second CTU line of the picture in the second history MVP buffer, the second CTU line being different than the first CTU line.

In another example, a device for coding video data includes a memory configured to store video data; means for storing motion information for a first coding tree unit (CTU) line of a picture in a first history motion vector predictor (MVP) buffer of the memory; means for resetting a second history MVP buffer of the memory; and means for storing motion information for a second CTU line of the picture in the second history MVP buffer after resetting the second history MVP buffer, the second CTU line being different than the first CTU line.

The details of one or more examples are set forth in the accompanying drawings and the description below. Other features, objects, and advantages will be apparent from the description and drawings, and from the claims.

BRIEF DESCRIPTION OF DRAWINGS

FIG. 8 is a conceptual diagram illustrating an example of motion information used for HMVP.

FIGS. 10A and 10B are block diagrams illustrating example spatial neighboring motion vector candidates for merge and advanced motion vector prediction (AMVP) modes.

DETAILED DESCRIPTION

Figure 1:
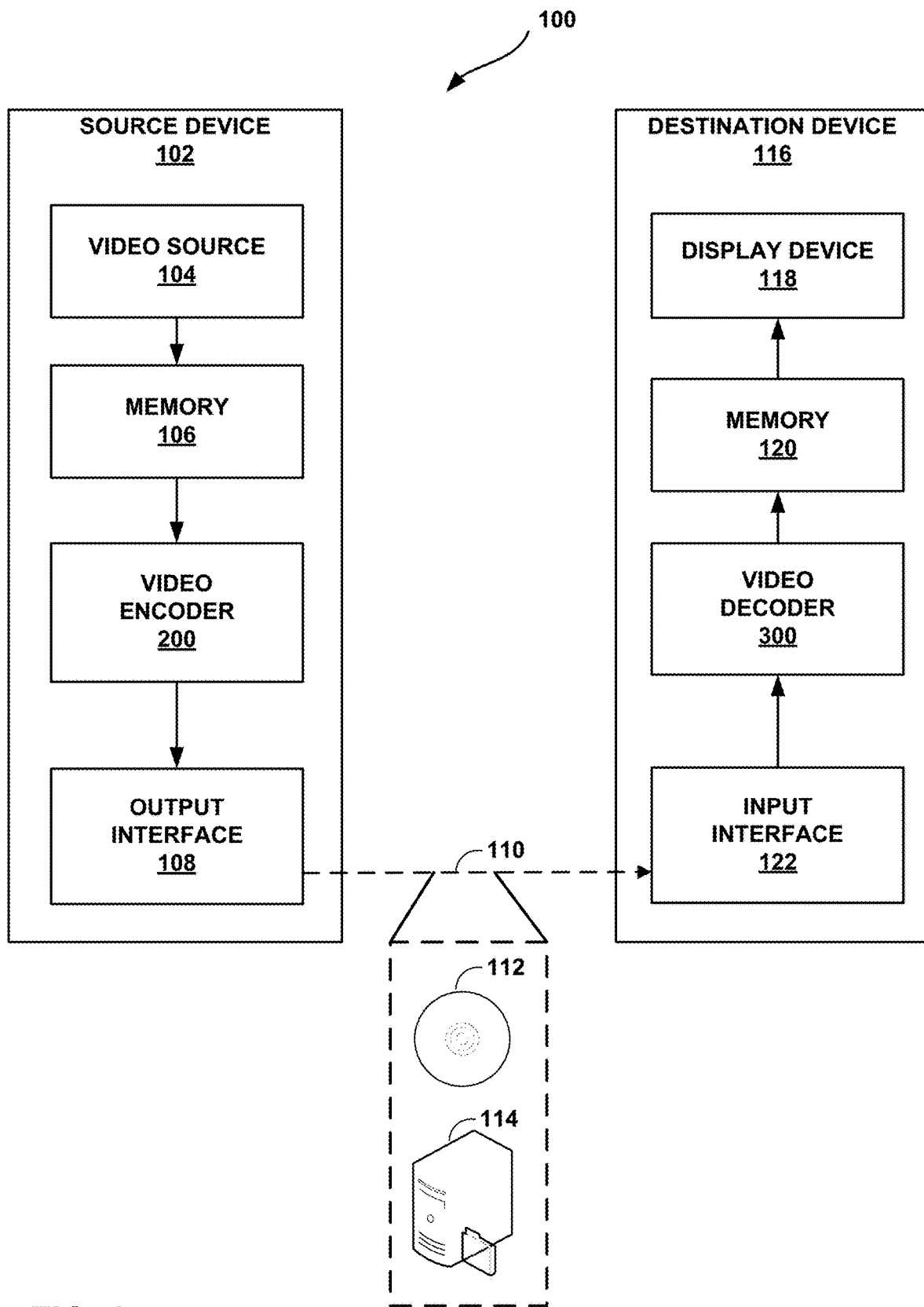
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding motion information. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding motion information. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116.

In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting:

Geneva, CH, 19-27 March 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or a Multi-Type Tree (MTT) structure. The QTBT structure removes the concepts of multiple partition types, such as the separation between CUs, PUs, and TUs of HEVC. A QTBT structure may include two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT) may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT or MTT structure for the luminance component and another QTBT or MTT structure for both chrominance components (or two QTBT or MTT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to perform wavefront parallel processing when coding a picture of video data. In general, wavefront parallel processing may involve coding individual lines of coding tree units (CTUs) using separate processing threads. For instance, a first thread executed by video encoder 200 or video decoder 300 may process a first line of CTUs, a second thread may process a second line of CTUs, and so forth. Coding a CTU includes, among other things, coding motion information for motion predicted coding units (CUs) of the CTU, which may refer to motion information within the same CTU or a previously coded CTU (e.g., a left- and/or above-neighboring CTU). Such motion information may be stored in a motion vector predictor (MVP) buffer. In accordance with the techniques of this disclosure, video encoder 200 and video decoder 300 may be configured to reset an MVP buffer for a current CTU line prior to coding video data of the current CTU line. The MVP buffer may be an individual MVP buffer for the current CTU line, or a common MVP buffer may be used for multiple lines of CTUs.

In some examples, when storing motion information to an MVP buffer, video encoder 200 and video decoder 300 may store only unique motion information within the MVP buffer. For example, video encoder 200 and video decoder 300 may code a current CU using a current motion vector, determine whether the motion vector is currently stored in an MVP buffer for the current CU, and if so, prevent storing the motion vector in the MVP buffer, and if not, store the motion vector in the MVP buffer.

In some examples, video encoder 200 and video decoder 300 may use a first-in-first-out (FIFO) rule to remove motion vectors from the MVP buffer when the MVP buffer becomes full. That is, in order to add a new motion vector to the MVP buffer, video encoder 200 and video decoder 300 may remove an earliest-inserted motion vector from the MVP buffer, and insert the new motion vector into the MVP buffer. In this manner, the MVP buffer may have a queue-like behavior.

In some examples, video encoder 200 and video decoder 300 may maintain separate MVP buffers for each of a variety of types of different motion models. For example, video encoder 200 and video decoder 300 may maintain an affine MVP buffer for affine motion model, an intra block copy MVP buffer for motion information of intra block copy mode, an illumination compensation MVP buffer for motion information of local illumination compensation, a sub-block MVP buffer for sub-block MVP, and/or a temporal MVP buffer for temporal motion prediction.

In some examples, video encoder 200 and video decoder 300 may generate a synthetic MVP from two or more MVPs in one or more MVP buffers and insert the synthetic MVP into one of the MVP buffers. The two or more MVPs may conform to the same or different motion models (that is, have different motion information types).

Figure 2A:
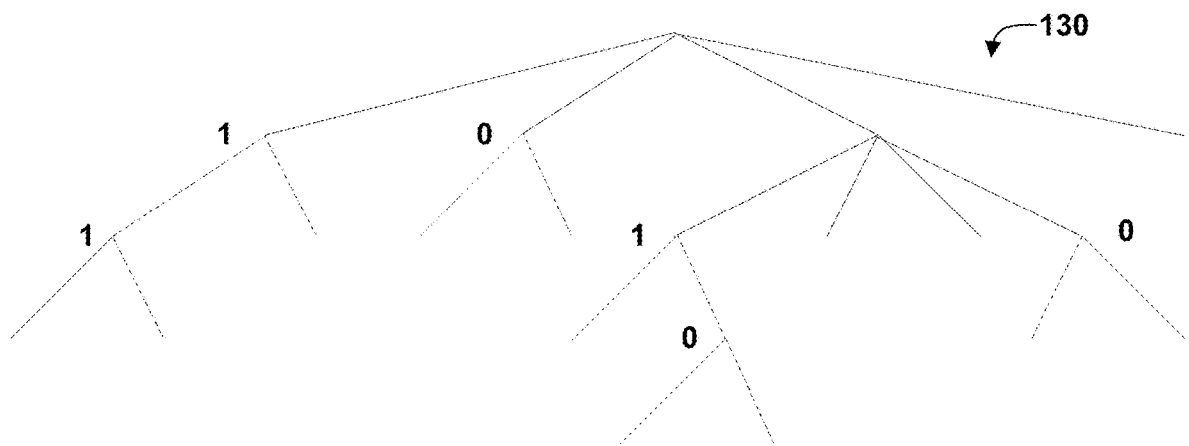
FIGS. 2A and 2B are conceptual diagrams illustrating an example quadtree binary tree (QTBT) structure, and a corresponding coding tree unit (CTU).
Figure 2B:
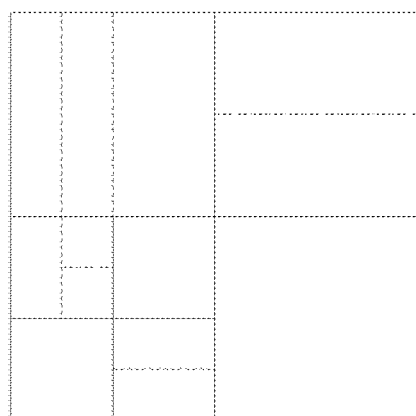

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels (e.g., region tree level and prediction tree level). These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further vertical splitting is permitted. Similarly, a binary tree node having a height equal to MinBTSize implies no further horizontal splitting is permitted for that binary tree node. As noted above, leaf nodes of the binary tree are referred to as CUs, and are further processed according to prediction and transform without further partitioning.

Figure 3:
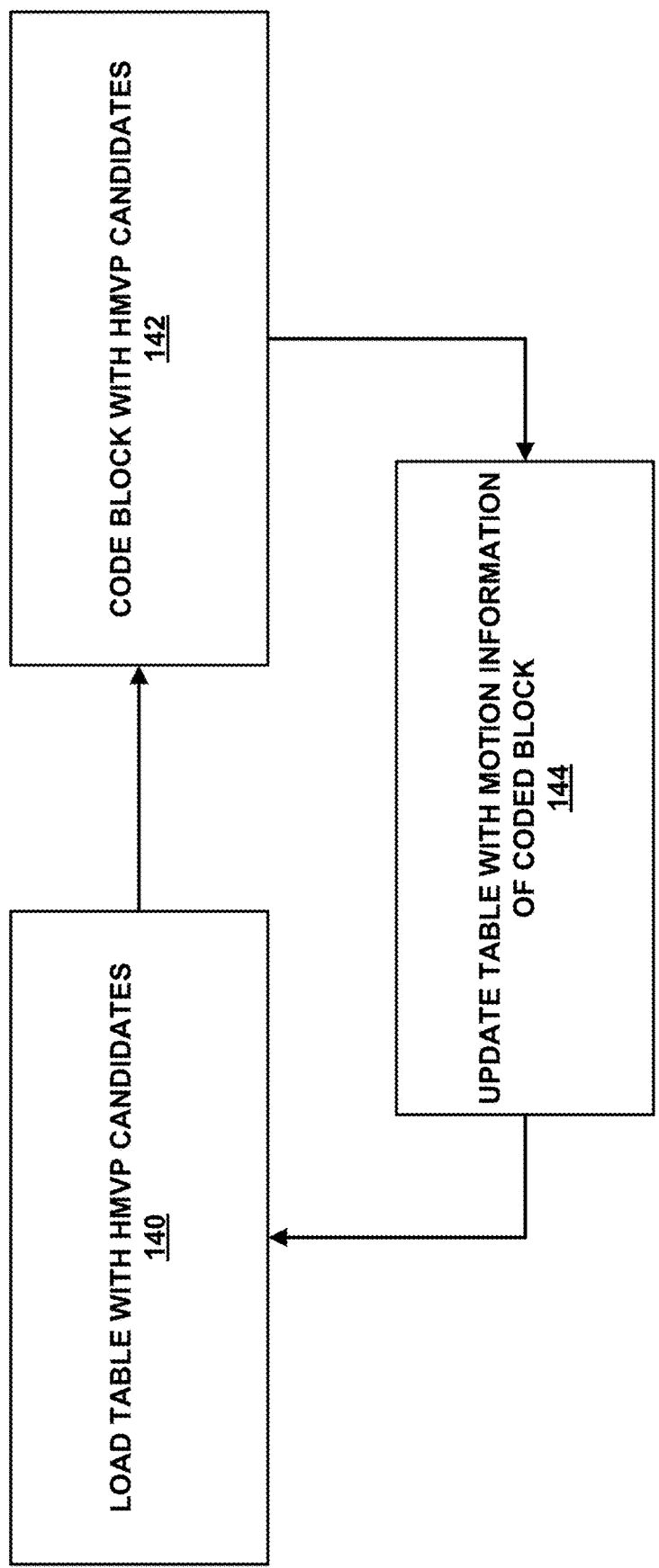
FIG. 3 is a flow diagram illustrating an example process for coding motion information using history motion vector predictors (HMVP).

FIG. 3 is a flow diagram illustrating an example process for coding motion information using history motion vector predictors (HMVP). Initially, a video coder, such as video encoder 200 or video decoder 300, loads a table with HMVP candidates (140). The video coder then codes a block of video data using the HMVP candidates (142). The video coder then updates the table with motion information of the coded block (144).

Figure 4:
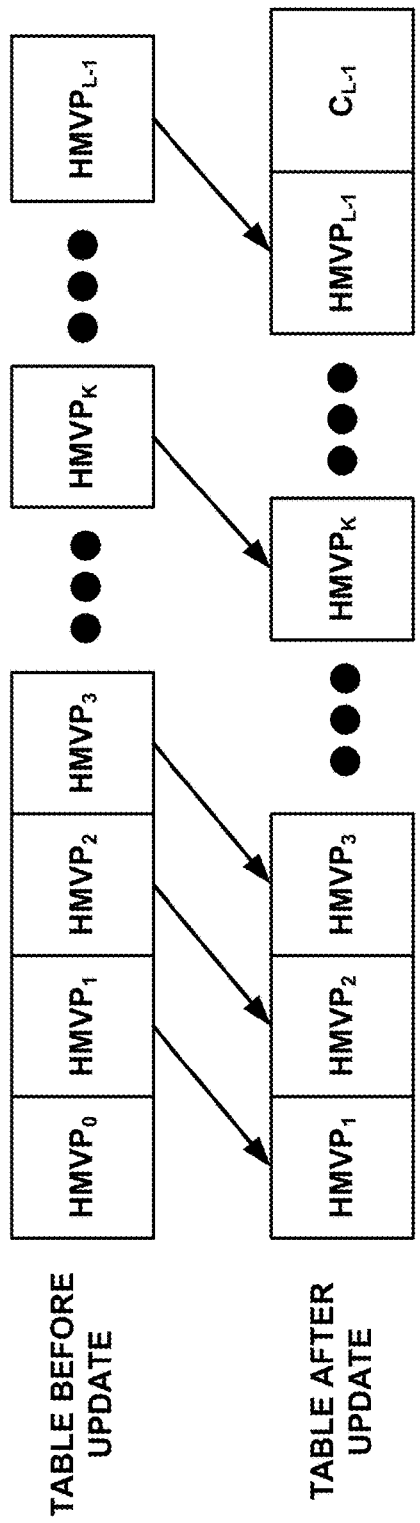
FIG. 4 is a conceptual diagram illustrating an example of updating an HMVP table.

FIG. 4 is a conceptual diagram illustrating an example of updating an HMVP table. In JVET-K0104, the table size is set to be 16 and a First-In-First-Out (FIFO) rule is applied. FIG. 4 depicts an example wherein the FIFO rule is applied to remove a HMVP candidate and add a new one to the table used in examples of the techniques of this disclosure.

A video coder, such as video encoder 200 or video decoder 300, may insert HMVP candidates from the last entry to the first entry in the table after a temporal motion vector prediction (TMVP) candidate in a candidate list. The video coder may apply pruning to the HMVP candidates. The video coder may terminate the pruning process when the total number of available merge candidates reaches a signaled maximum allowed number of merge candidates.

In the example of FIG. 4, the table before the update includes history MVP( ) ($HMVP_0$) to history $MVP_{L-1}$ ($HMVP_{L-1}$), where the subscript numbers 0 to L-1 represent an order in which the history MVPs are added. $C_{L-1}$ represents a new history MVP to be added to the table. Thus, according to the FIFO rule, $HMVP_0$ is removed from the table prior to adding $C_{L-1}$, in this example.

Figure 5:
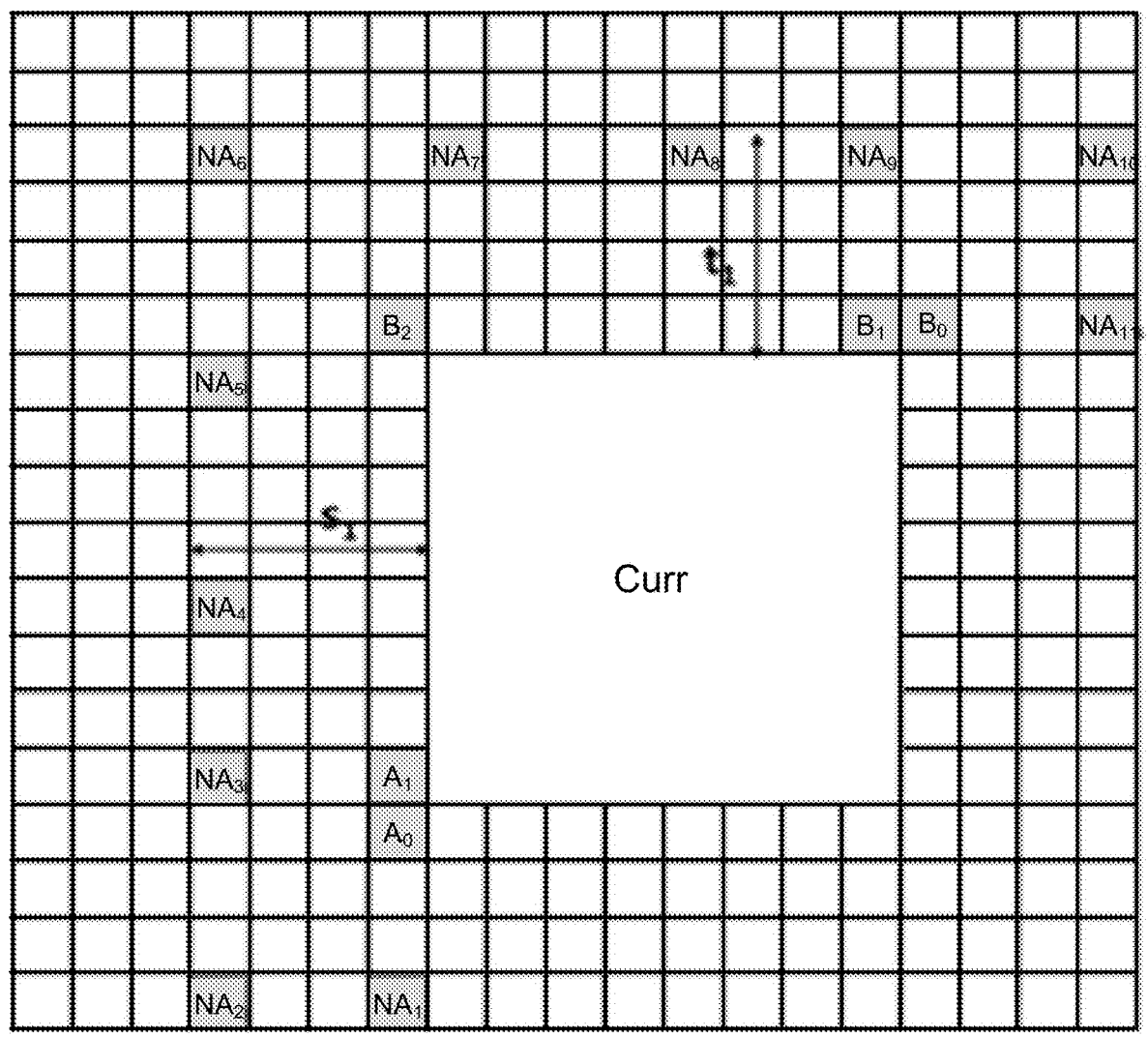
FIG. 5 is a conceptual diagram illustrating an example selection of non-adjacent blocks for motion information coding.

FIG. 5 is a conceptual diagram illustrating an example selection of non-adjacent blocks for motion information coding. In the example of FIG. 5, a current block labeled "Curr" represents a current coding unit (CU), for which motion information may be coded using adjacent and/or non-adjacent neighboring blocks labeled $A_i$, $B_j$, and $NA_k$. Non-adjacent motion vector prediction is described, e.g., in U.S. application Ser. No. 16/003,269, filed Jun. 8, 2018. A video coder may apply a FIFO rule and a maximum size of buffer of motion candidates for non-adjacent blocks.

Figure 6:
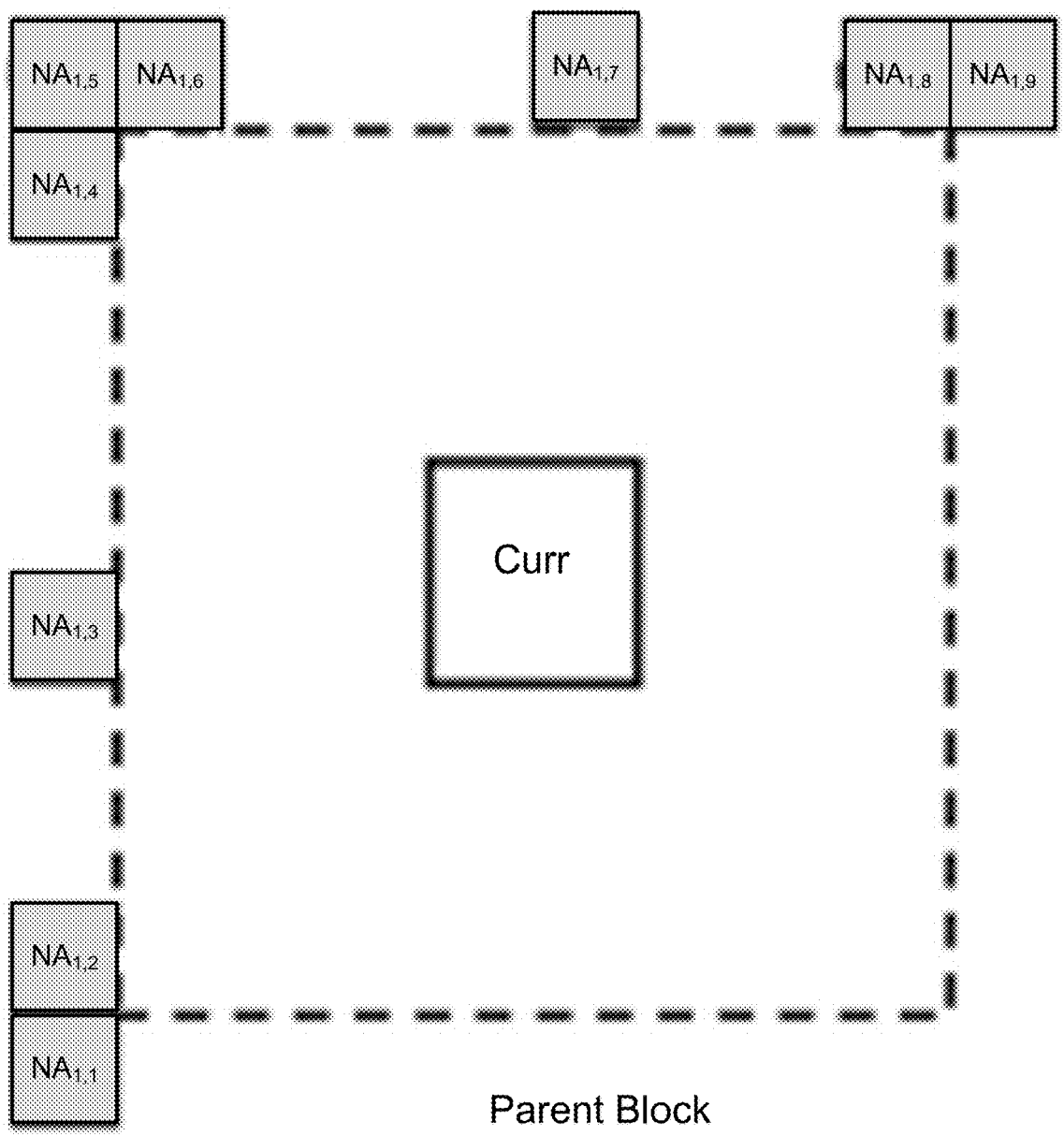
FIG. 6 is a conceptual diagram illustrating an example selection of non-adjacent blocks based on a parent block.

FIG. 6 is a conceptual diagram illustrating an example selection of non-adjacent blocks based on a parent block. That is, the parent block is a block partitioned into sub-blocks, including the current block. For example, the parent block may be a CTU or a sub-block into which the CTU has been partitioned. Similar to FIG. 5, in FIG. 6, a current CU is labeled "Curr," and non-adjacent blocks from which motion information may be retrieved and used to predict motion information of the current CU are labeled "$NA_{i,j}$."

Motion vectors of adjacent spatial blocks of a collocated block may be used as motion vector prediction (MVP) candidates for merge mode, in addition to motion vectors H and C (that is, motion vectors at the center and bottom-right of the collocated block).

The techniques of this disclosure may be used to improve motion vector prediction, e.g., by adding candidates used for AMVP and/or merge coding modes, where the added candidates may be taken from non-adjacent blocks. For example, the added candidates may correspond to any of $NA_{1,1}$ to $NA_{1,9}$ of FIG. 6.

Figure 7:
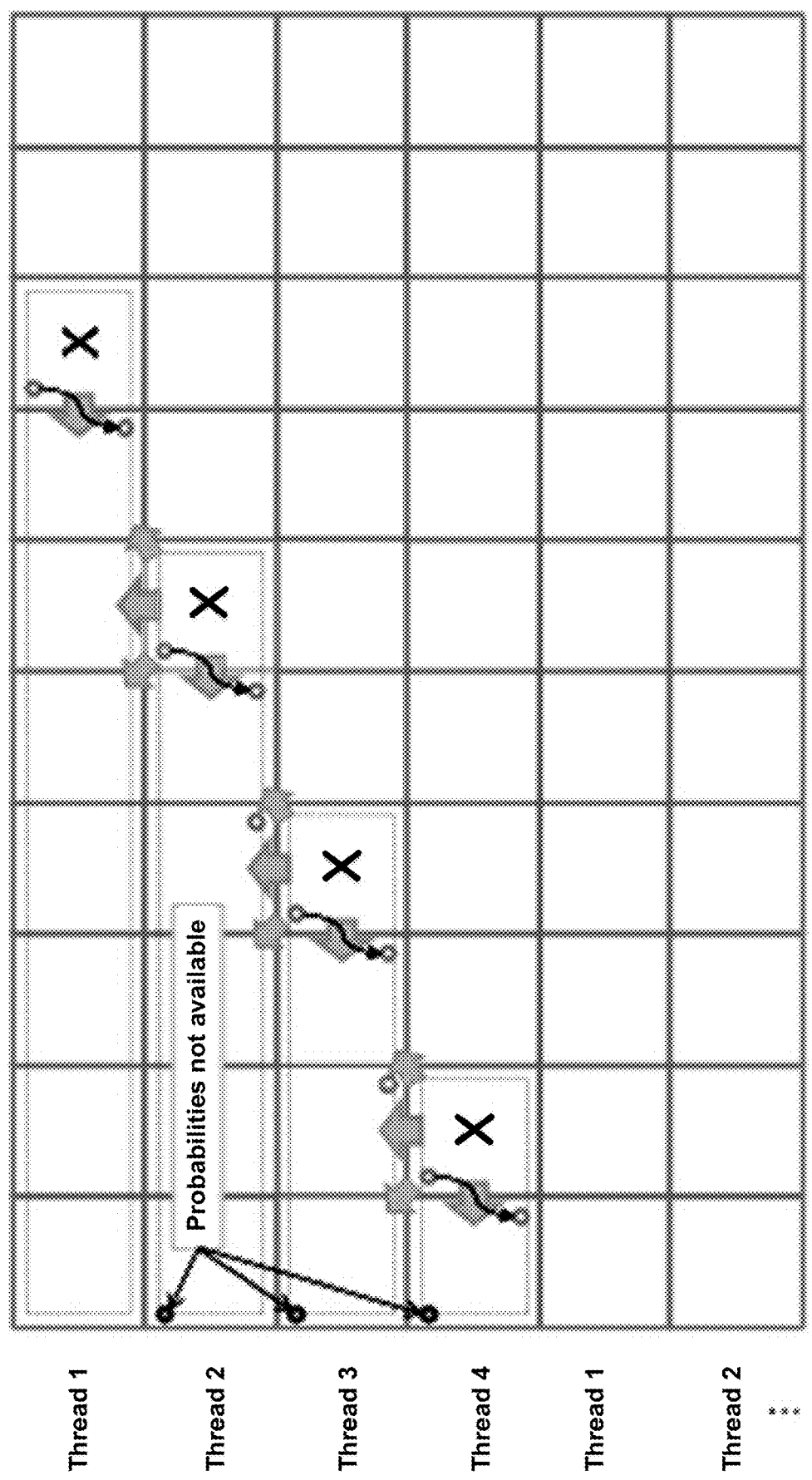
FIG. 7 is a conceptual diagram illustrating an example of a desired wave-front processing of coding tree units (CTUs).

FIG. 7 is a conceptual diagram illustrating an example of a desired wave-front processing of coding tree units (CTUs). As shown in FIG. 7, various threads may be assigned to process different lines of CTUs. That is, a video coder, such as video encoder 200 or video decoder 300, may execute multiple different threads for, e.g., wavefront parallel processing (WPP) when coding different CTU lines. In some examples, certain probabilities used for context-based coding (e.g., CABAC coding) motion information of inter-predicted blocks could not be determined if the probabilities were to be determined from a last block of a previous CTU line, e.g., assuming that the last block had not yet been coded. Thus, in accordance with the techniques of this disclosure, video encoder 200 and video decoder 300 may reset a CTU buffer for a CTU line before coding the CTU line, to ensure that the CTU lines can be processed correctly.

Figure 8:
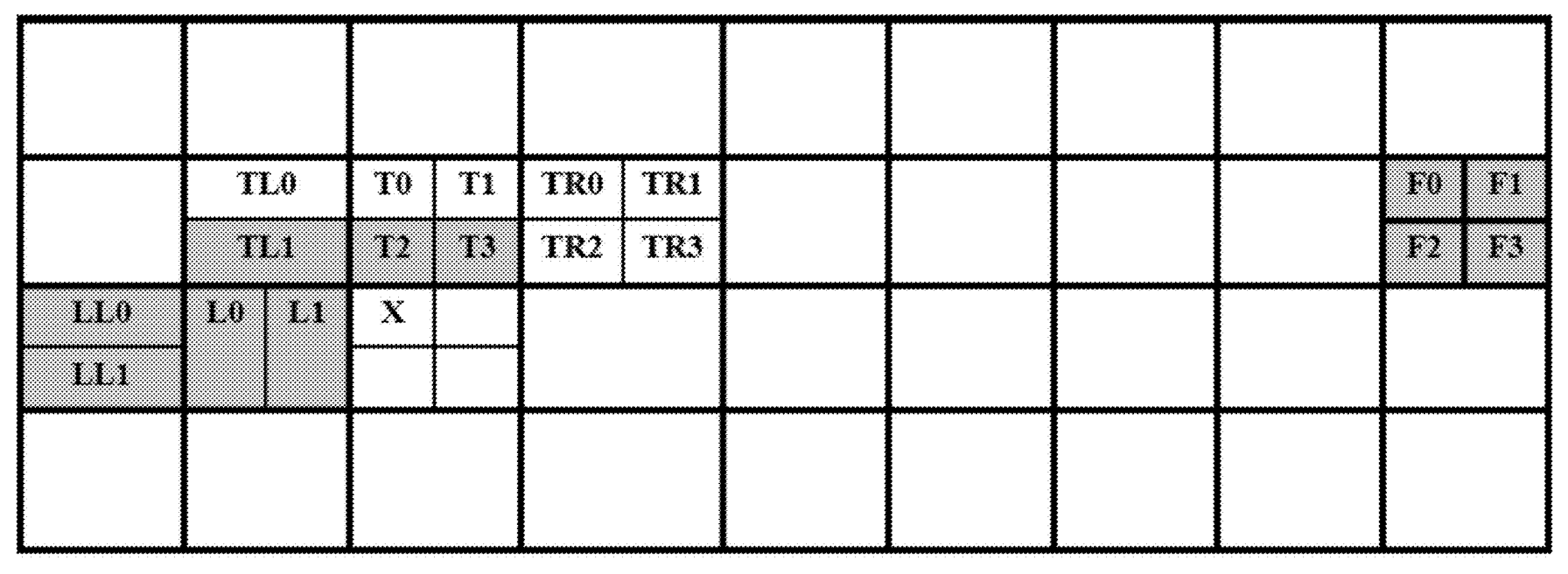

FIG. 8 is a conceptual diagram illustrating an example of motion information used for HMVP. FIG. 8 illustrates how the use of FIFO can remove motion vectors of closer blocks to a current block from a candidate list, while motion vectors of further blocks could be considered. In particular, in FIG. 8, X represents motion information currently being coded, and the MVs of shaded blocks are in the history buffer. This disclosure recognizes that conventional HMVP techniques do not fully utilize motion vectors of non-adjacent blocks at least in part due to the use of the FIFO rule, as shown in FIG. 8.

In particular, when block X is coded, motion information of non-adjacent blocks (TL0, T0, T1, TR0, TR1, TR2, TR3) of the top-left CTU, top CTU, and top-right CTU have been removed from the history buffer. Therefore, the motion information of these blocks is not considered for addition to the candidate list, even if the non-adjacent blocks are closer to X than, e.g., CTU LL0, CTU LL1, and CTUs F0-F3, whose motion vectors are in the history buffer.

This disclosure also recognizes that a single buffer for HVMP is not applicable for wave-front parallel processing. If only a single buffer is used, the size of the buffer would be very high, to contain the potential spatial candidates for blocks being processed in every thread (for example, CTU line). For example, if four threads are set to run in parallel, the size of the buffer can reach 64. As a result, more bits are needed to signal an index of the MVP to video decoder 300. Likewise, redundant entries may occur. That is, an entry in the history buffer may be potentially useful for a block in this line, but it might not be useful for blocks at other lines (e.g., X and F in FIG. 8). Consequently, it may be hard to find the optimal candidate for a block.

Figure 9:
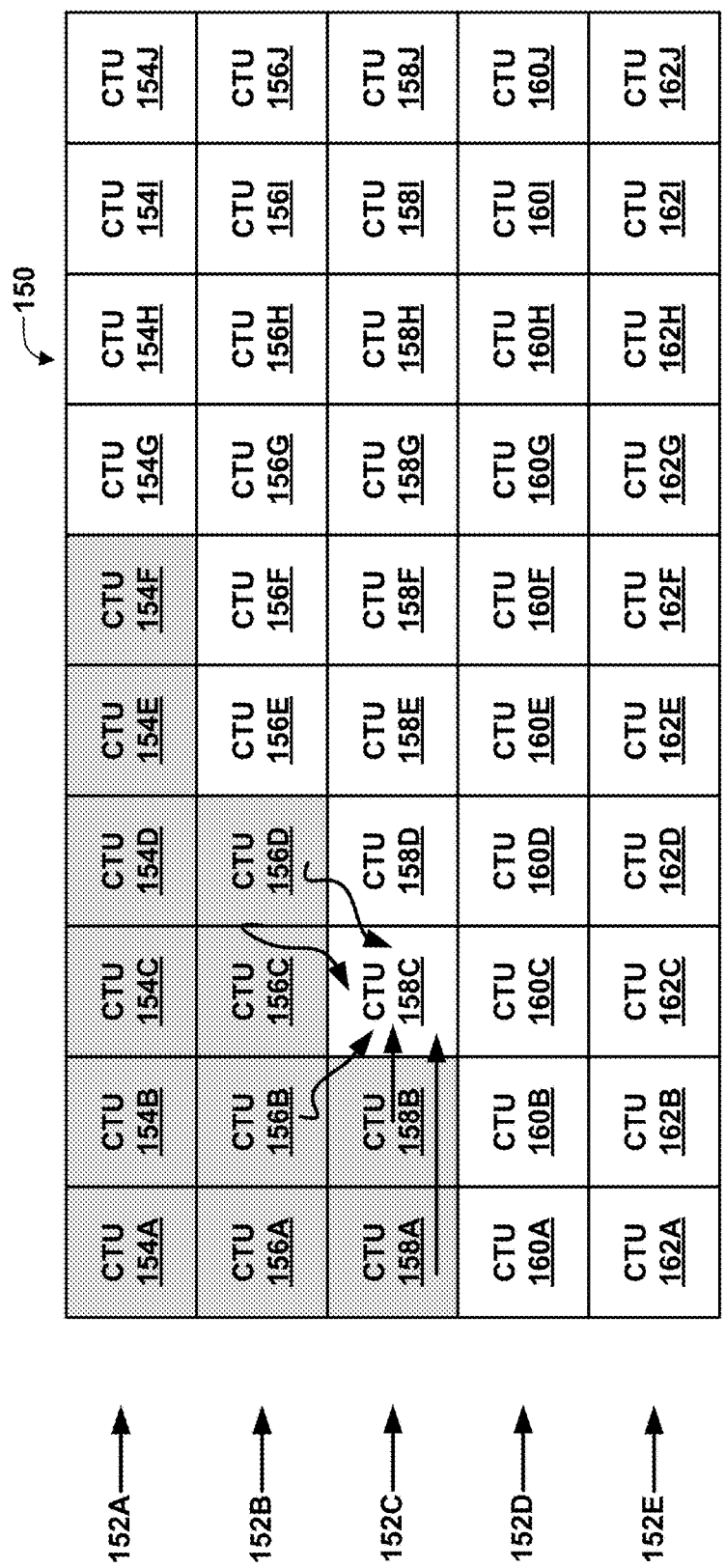
FIG. 9 is a conceptual diagram illustrating an example of a picture partitioned into multiple lines of coding tree units (CTUs).

FIG. 9 is a conceptual diagram illustrating an example of a picture partitioned into multiple lines of coding tree units (CTUs). In particular, in the example of FIG. 9, picture 150 includes CTU lines 152A-152E (CTU lines 152). Each of CTU lines 152 includes a respective set of CTUs: CTU line 152A includes CTUs 154A-154J, CTU line 152B includes CTUs 156A-156J, CTU line 152C includes CTUs 158A-158J, CTU line 152D includes CTUs 160A-160J, and CTU line 152E includes CTUs 162A-162J.

Video encoder 200 and video decoder 300 may be configured according to the techniques of this disclosure to use multiple buffers for history-based MVP. In some examples, video encoder 200 and video decoder 300 may maintain separate history MVP buffers for each of CTU lines 152 (each of which may be processed by a separate, respective processing thread), or there can be a single buffer that is reset at the beginning of each CTU line when wavefront parallel processing is applied.

In one example, CTU 158C may represent a current CTU. Motion information of CTUs 154A-154F, 156A-156D, 158A, and 158B (shown using grey shading in FIG. 9) may be available in one or more respective history MVP buffers for use when coding motion information of CTU 158C.

Additionally or alternatively, video encoder 200 and video decoder 300 may perform initialization of a history MVP buffer using any or all of the following techniques, alone or in combination. Video encoder 200 and video decoder 300 may reset the history MVP buffer of each CTU line to be empty. Video encoder 200 and video decoder 300 may pre-fill the history MVP buffer of each CTU line with zero motion vectors with different reference frame index and/or inter-prediction directions, or other pre-defined or derived motion information. Video encoder 200 and video decoder 300 may pre-fill the history MVP buffer of each CTU line with motion information from the coded frames (pictures) in the same temporal layer or lower temporal layers (reference pictures that are available for the current frame/picture).

Video encoder 200 and video decoder 300 may scale the motion information, for example based on temporal distance, or process/modify the motion information, e.g., combine this motion information with another MV. In general, video encoder 200 and video decoder 300 may combine the motion information with motion information from the previous history MVP buffer in the coded frames/pictures, or motion information of the co-located region (may be CTU, or larger than a certain block size, for example 4×4 block) in the coded frames/pictures. Video encoder 200 and video decoder 300 may pre-fill the history MVP buffer of an above CTU line when the above-right CTU of the current CTU is coded. Video encoder 200 and video decoder 300 may use zero motion vectors with different reference frame indexes and/or inter prediction directions, or other pre-defined or derived motion information.

Additionally or alternatively, video encoder 200 and video decoder 300 may, whenever a CTU of CTU lines is coded (encoded or decoded), use the associated history MVP buffer to initialize or modify the history buffers of the CTU line below the current CTU line.

Additionally or alternatively, video encoder 200 and video decoder 300 may apply a FIFO rule to remove an entry from an associated history MVP buffer.

Additionally or alternatively, video encoder 200 and video decoder 300 may clear a history MVP buffer when the associated CTU line is completely encoded/decoded.

Video encoder 200 and video decoder 300 may maintain a MVP buffer size that is larger than AMVP/merge or other mode candidate lists. Any MV or MVs from the buffer can be selected as MV candidate(s) for the candidate list used in a certain mode, for example AMPV, merge mode, affine, or any other inter mode. A rule can be defined how to select MVs from the buffer, for example, take N last added MVs to the buffer, or take some from the beginning of the buffer, and/or some from the middle of the buffer, and/or some from the end of the buffer. Alternatively, signaling can be applied to indicate which MVs are selected (e.g., video encoder 200 may encode signaled data, and video decoder 300 may decode the signaled data). The MVP buffer size can be signaled in any parameter set (e.g., video parameter set, sequence parameter set, picture parameter set, or the like), slice header, or elsewhere. The MVP buffer can be associated with a slice, picture, and/or video sequence.

When video encoder 200 and video decoder 300 process an inter-coded block, the MVs used in the block can be added to the MVP buffer, and only unique MVs may be kept in the buffer. When the buffer is full, older MVs can be removed from the buffer when new MV is added. There can be a rule by which MVs can be added to the buffer, for example, only signaled MV, such as in AMVP mode, can be added, and if a block is coded in merge mode, the MV of the block is not added to the buffer.

Video encoder 200 and video decoder 300 may append a MV to already existing MV or MVs in the buffer. For example, if the already existing MVs in the buffer are uni-directional, when adding a new MV, those existing MVs can be modified to be bi-directional by appending the new MV.

Some MV processing can be applied while adding a new MV. For example, if a new MV is close to already existing MVs in the buffer, those close MVs can be removed. Close may mean close by comparing MV components values (e.g., x- and y-components). In some examples, only MVs that differ from already existing MVs in the buffer by a threshold may be added to the buffer. The same threshold may be configured for different buffers.

Motion vectors in the buffer can be uni-directional (L0 or L1), bi-directional, or any other motion model MV.

Mode information can be associated with a MV in the buffer, and if an index of a MV in the buffer is signaled in the block or other rule is applied about obtaining MV from the buffer, then the mode information may be derived from data associated with that MV information. For example, if that information is merge mode, then the block is coded in merge mode with the indicated MV.

This disclosure further recognizes that conventional, history-based MVPs only hold regular motion predictors, and are only used for regular motion prediction without modifying the motion information. In accordance with the techniques of this disclosure, video encoder 200 and video decoder 300 may use at least one history MVP buffer that holds not only coded motion information but also other types of motion predictors, such as for affine motion model, motion information of intra block copy mode, motion information of local illumination compensation, sub-block MVP, or temporal motion predictor.

Additionally or alternatively, video encoder 200 and video decoder 300 may use multiple history MVP buffers for different motion models, such as affine motion model, motion information of intra block copy mode, motion information of local illumination compensation, sub-block MVP, or temporal motion predictor.

Additionally or alternatively, synthetic motion vector based on the current MVP and other motion predictor, such as other spatial MVP, or temporal MVP, may be also added to the candidate list.

Additionally or alternatively, video encoder 200 and video decoder 300 may generate a synthetic MVP from two or more MVPs in the history MVP buffer or one or more MVPs in the history MVP buffer with other type of MVPs, such as spatial or temporal MVPs.

Video encoder 200 and video decoder 300 may implement a block partitioning scheme. In HEVC, pictures are divided into a sequence of coding tree units (CTUs). For a picture that has three sample arrays, a CTU includes an N×N block of luma samples together with two corresponding blocks of chroma samples. A CTU is split into coding units (CUs) by using a tree structure. Each leaf CU can be further split into one, two, or four prediction units (PUs) according to the PU splitting type. After obtaining the residual block by applying the prediction process based on the PU splitting type, a leaf CU can be partitioned into transform units (TUs).

In VVC, a quadtree with nested multi-type tree using binary and ternary splits segmentation structure replaces the concepts of multiple partition unit types, i.e., the nested multi-type tree partitioning removes the separation of the CU, PU and TU concepts except as needed for CUs that have a size too large for the maximum transform length and supports more flexibility for CU partition shapes. In the coding tree structure, a CU can have either a square or rectangular shape.

Video encoder 200 and video decoder 300 may utilize motion information for predicting a block of video data. For each block, a set of motion information can be available. The set of motion information contains motion information for forward and backward prediction directions. Here, forward and backward prediction directions are two prediction directions corresponding to reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In cases where both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g., RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Picture order count (POC) is widely used in video coding standards to identify a display order of a picture. Although there are cases two pictures within one coded video sequence may have the same POC value, it typically doesn't happen within a coded video sequence. When multiple coded video sequences are present in a bitstream, pictures with a same value of POC may be closer to each other in terms of decoding order.

In HEVC, there are two inter prediction modes, named merge mode (with skip being considered as a special case of merge mode) and advanced motion vector prediction (AMVP) mode, respectively for a PU.

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index is explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes can be derived similarly from the same spatial and temporal neighboring blocks.

FIGS. 10A and 10B are block diagrams illustrating example spatial neighboring motion vector candidates for merge and advanced motion vector prediction (AMVP) modes. FIG. 10A shows an example of spatial neighboring MV candidates for merge mode, and FIG. 10B shows an example of spatial neighboring MV candidates for AMVP mode. Spatial MV candidates are derived from the neighboring blocks as shown in FIGS. 10A and 10B. For a specific PU (PU0), the methods for generating the candidates from the blocks differ for merge and AMVP modes.

In merge mode, up to four spatial MV candidates can be derived with the order shown in FIG. 10A. Specifically, the order is as follows: left (0), above (1), above right (2), below left (3), and above left (4), as shown in FIG. 10A.

In AVMP mode, the neighboring blocks are divided into two groups. The first group is a left group that includes blocks 0 and 1. The second group is an above group that includes blocks 2, 3, and 4, as shown in FIG. 10B. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

Figure 11B:
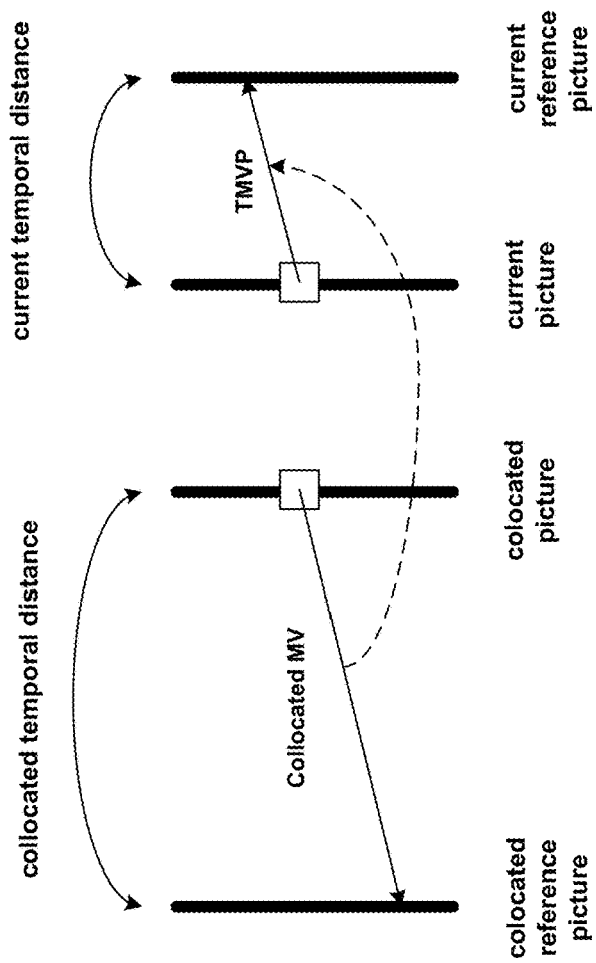
FIGS. 11A and 11B are conceptual diagrams illustrating temporal motion vector prediction (TMPV) candidates.
Figure 11A:
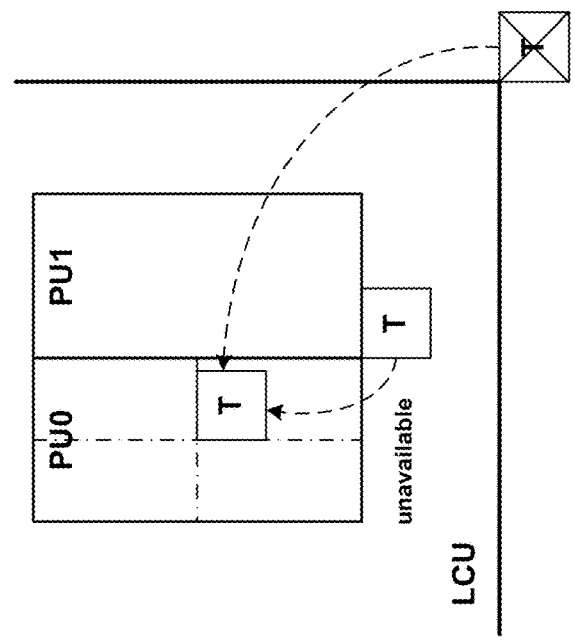

FIGS. 11A and 11B are conceptual diagrams illustrating temporal motion vector prediction (TMPV) candidates. FIG. 11A shows an example of a TMVP candidate. A TMVP candidate, if enabled and available, is added into the MV candidate list after spatial motion vector candidates. The process of motion vector derivation for a TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 11A as a block "T", to compensate the bias to the above and left blocks used to generate spatial neighboring candidates. However, if that block is located outside of the current CTB row or motion information is not available, the block is substituted with a center block of the PU.

A motion vector for a TMVP candidate is derived from the co-located PU of the co-located picture, indicated in the slice level. The motion vector for the co-located PU is called collocated MV.

FIG. 11B shows an example of MV scaling. To derive the TMVP candidate motion vector, the co-located MV may need to be scaled to compensate the temporal distance differences, as shown in FIG. 11B.

Several other aspects of merge and AMVP modes are worth mentioning as follows. For example, video encoder 200 and video decoder 300 may perform motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

As another example, video encoder 200 and video decoder 300 may perform artificial motion vector candidate generation. If a motion vector candidate list is not complete, artificial motion vector candidates are generated and inserted at the end of the list until it will have all candidates.

In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

As another example, video encoder 200 and video decoder 300 may perform a pruning process for candidate insertion. Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones. Only the following comparisons are applied if applicable: the above merge candidate is compared with the left merge candidate, the above right merge candidate is compared with the above merge candidate, the bellow left merge candidate is compared with the left merge candidate, the above left merge candidate is compared with the left merge candidate and above merge candidate.

Video encoder 200 and video decoder 300 may also use other motion prediction methods. In the development of Versatile Video Coding (VVC), a history-based motion vector prediction (HMVP) method was proposed in L. Zhang etc., "CE4-related: History-based Motion Vector Prediction", Joint Video Experts Team Document: JVET-K0104 (hereinafter "K0104"). The HMVP method allows each block to find its MV predictor from a list of MVs decoded from the past in addition to those immediately adjacent causal neighboring motion fields. A table with multiple HMVP candidates is maintained during the encoding/decoding process. The table is emptied when a new slice is encountered. Whenever there is an inter-coded block, the associated motion information is inserted to the table in a first-in-first-out (FIFO) fashion as a new HMVP candidate. Then, a constraint FIFO rule can be applied. When inserting an HMVP to the table, a redundancy check may be firstly applied to find whether there is an identical HMVP in the table. If found, that particular HMVP may be removed from the table, and all the HMVP candidates afterwards are moved.

HMVP candidates can be used in the merge candidate list construction process. For example, all HMVP candidates from the last entry to the first entry in the table may be inserted after the TMVP candidate. Pruning may be applied on the HMVP candidates. Once the total number of available merge candidates reaches the signaled maximally allowed merge candidates, the merge candidate list construction process is terminated.

Similarly, HMVP candidates can also be used in the AMVP candidate list construction process. The motion vectors of the last K HMVP candidates in the table can be inserted after the TMVP candidate. In some examples, only HMVP candidates with the same reference picture as the AMVP target reference picture are used to construct the AMVP candidate list. Pruning may be applied on the HMVP candidates.

In HEVC, the coding of a current CTU may only depend on the CTUs to the left, above-left, above, and above-right. Thus, wavefront parallel processing (WPP) can be supported in HEVC. However, the HMVP method in K0104 may cause dependency between a current block and all the previously coded CTUs in a slice. Therefore, WPP may not be applied if the HMVP method is used. This disclosure describes techniques for using HMVP with CTU initialization, in which the dependencies remain the same as in HEVC. This disclosure also describes techniques for HMVP with CTU row initialization (reset).

According to the techniques of this disclosure, video encoder 200 and video decoder 300 may perform HMVP with CTU initialization. The HMVP table is initialized at the beginning of each CTU. The initialization may add MVs from the immediate neighboring coded blocks of current CTU into the HMVP table. The immediate neighboring coded block may be to the left, above, above-left or above right of the current CTU as in HEVC. If temporal motion vector prediction is enabled, the immediate neighboring coded block may also be the collocated block in the reference picture.

Figure 12:
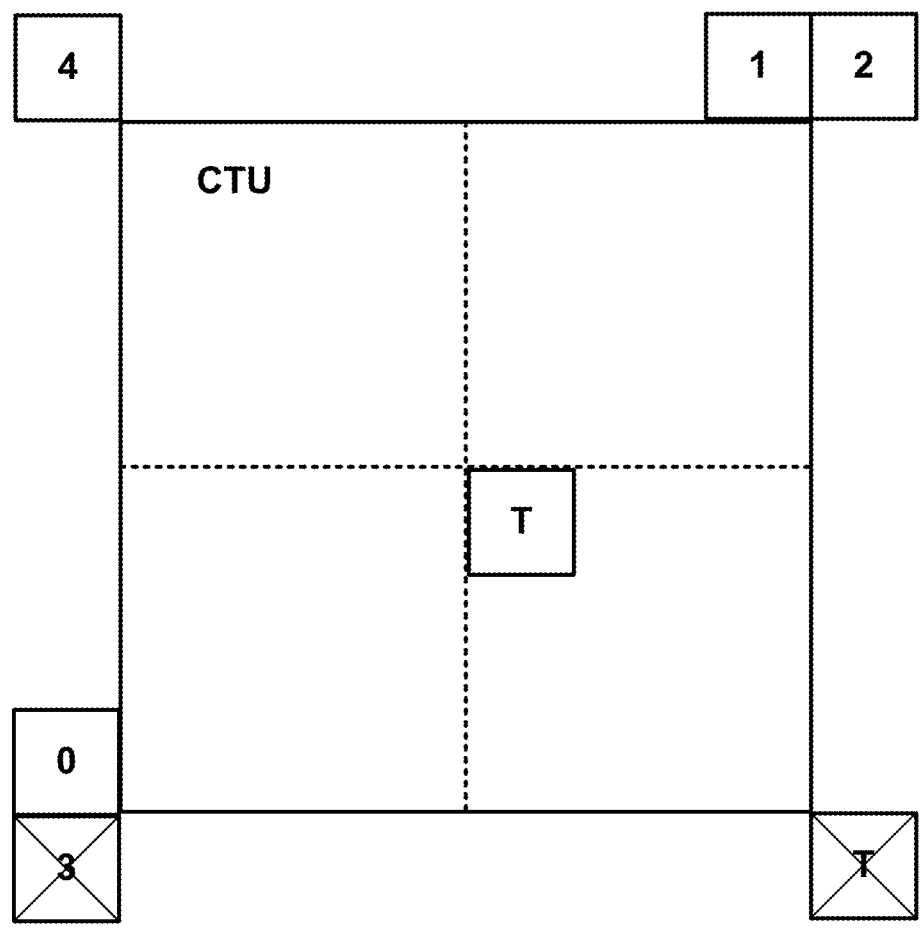
FIG. 12 is a block diagram illustrating an example of a coding tree unit (CTU) and neighboring blocks.

FIG. 12 is a block diagram illustrating an example of a coding tree unit (CTU) and neighboring blocks. In one example, only the spatial and temporal merge candidates for the current CTU block are used to initialize the HMVP table. An example of using HEVC spatial and temporal merge candidates is shown in FIG. 12. The insertion order is the following: left (0), above (1), above right (2), and above-left (4). The location of temporal merge candidate is indicated by "T". Note that the bottom right temporal merge candidate and the below left (3) candidate are not available since their locations are below the current CTU line.

In another example, the merge candidate derivation process for the current CTU block is used to initialize the HMVP table. In addition to the spatial and temporal merge candidates, other merge candidates (artificial motion vector candidates for example) may also be used for the initialization.

Figure 13:
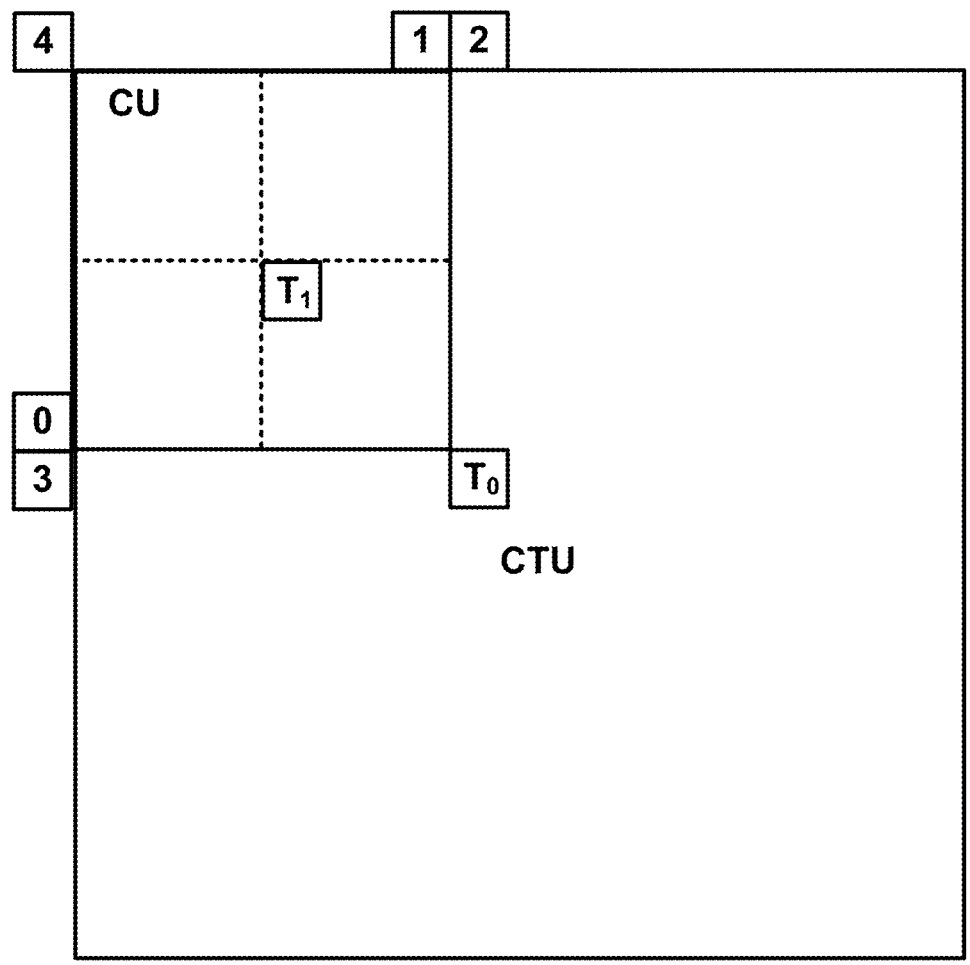
FIG. 13 is a block diagram illustrating a current CU in a current CTU.

FIG. 13 is a block diagram illustrating a current CU in a current CTU. In some examples, the HMVP table is initialized as empty at the beginning of coding current CTU. However, after the first CU is coded, the spatial and temporal merge candidates of the first CU, as shown in FIG. 13, are added into the HMVP table. And then, the MV of the first CU is also added if the CU is inter-prediction coded. Note that if the first CU is not equal to current CTU, two temporal merge candidates "T0" and "T1" in order may be added. FIG. 13 shows an example of merge candidates of the first CU in a CTU.

In another example, the HMVP table is initialized as empty at the beginning of coding current CTU. However, after the first CU is coded, all the merge candidates of the first CU are added into the HMVP table. And then the MV of the first CU is also added if it's inter-prediction coded.

Video encoder 200 and video decoder 300 may also perform HMVP with CTU row initialization. In another example, the CTU initialization for HMVP described above is applied only at the first CTU in a CTU row. Similar to the HMVP in K0104, pruning process may be applied to the initialized table to remove some or all duplicates. The pruning process also may not be applied to the initialized table to reduce complexity.

Figure 14:
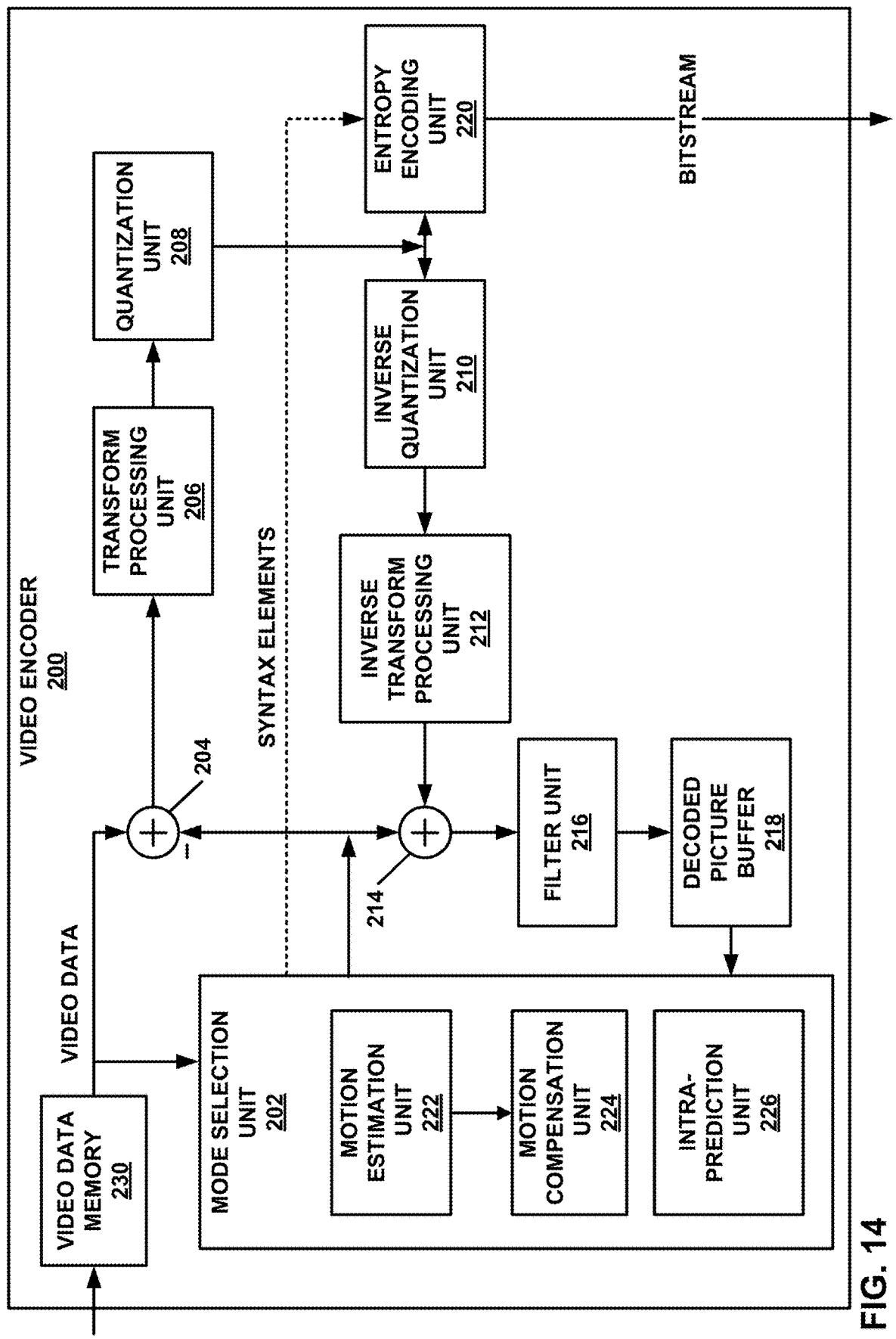
FIG. 14 is a block diagram illustrating an example video encoder that may perform the techniques of this disclosure.

FIG. 14 is a block diagram illustrating an example video encoder 200 that may perform the techniques of this disclosure. FIG. 14 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 14, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 14 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, decoded picture buffer 218 may include one or more history MVP buffers for lines of CTUs. That is, each CTU line may be allocated its own MVP buffer, or a single MVP buffer may be used for a plurality of CTU lines. In any case, video encoder 200 may reset an MVP buffer for a CTU line at the beginning of decoding video data of the CTU line. Motion compensation unit 224 or another unit of video encoder 200 may be configured to store only unique motion vectors to the MVP buffer. As discussed above, motion compensation unit 224 or another unit of video encoder 200 may be configured to use a FIFO rule to manage motion information stored in the MVP buffer, such that when adding a motion vector to the MVP buffer, if the MVP buffer is full, motion compensation unit 224 may remove an earliest-added motion vector from the MVP buffer. In some examples, video encoder 200 may maintain different respective MVP buffers for each of a variety of motion models, such as, for example, affine motion model, motion information of intra block copy mode, motion information of local illumination compensation, sub-block MVP, and temporal motion prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to store motion information for a first coding tree unit (CTU) line in a first history motion vector predictor (MVP) buffer of the memory, and store motion information for a second CTU line in a second history MVP buffer of the memory, the second CTU line being different than the first CTU line.

Video encoder 200 also represents an example of a device configured to encode video data including a memory configured to store video data, and one or more processing units implemented in circuitry and configured to store coded motion information to a history motion vector predictor (MVP) buffer, store a different type of motion information to the history MVP buffer, and code motion information of a block of video data using motion information of the history MVP buffer.

Video encoder 200 also represents an example of a device configured to encode video data including a memory configured to store video data, and one or more processing units implemented in circuitry and configured to store a plurality of different types of motion information in respective, different history motion vector predictor (MVP) buffers.

Figure 15:
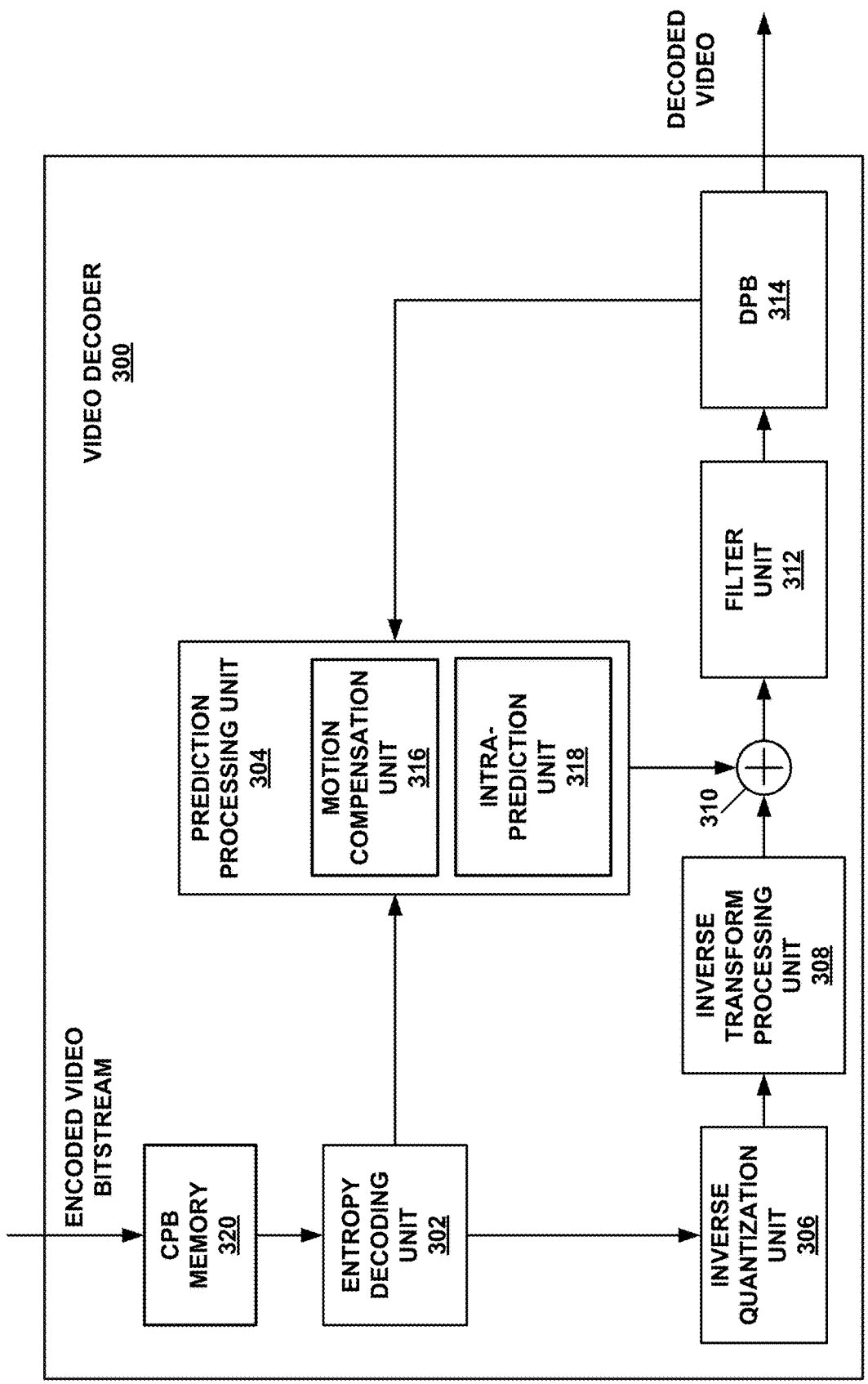
FIG. 15 is a block diagram illustrating an example video decoder that may perform the techniques of this disclosure.

FIG. 15 is a block diagram illustrating an example video decoder 300 that may perform the techniques of this disclosure. FIG. 15 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured according to other video coding standards.

In the example of FIG. 15, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 15 are illustrated to assist with understanding the operations performed by video decoder 300. The units may be implemented as fixed-function circuits, programmable circuits, or a combination thereof. Similar to FIG. 14, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 14).

In accordance with the techniques of this disclosure, decoded picture buffer 314 may include one or more history MVP buffers for lines of CTUs. That is, each CTU line may be allocated its own MVP buffer, or a single MVP buffer may be used for a plurality of CTU lines. In any case, video decoder 300 may reset an MVP buffer for a CTU line at the beginning of encoding video data of the CTU line. Motion compensation unit 316 or another unit of video decoder 300 may be configured to store only unique motion vectors to the MVP buffer. As discussed above, motion compensation unit 316 or another unit of video decoder 300 may be configured to use a FIFO rule to manage motion information stored in the MVP buffer, such that when adding a motion vector to the MVP buffer, if the MVP buffer is full, motion compensation unit 316 may remove an earliest-added motion vector from the MVP buffer. In some examples, video decoder 300 may maintain different respective MVP buffers for each of a variety of motion models, such as, for example, affine motion model, motion information of intra block copy mode, motion information of local illumination compensation, sub-block MVP, and temporal motion prediction.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 14). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not needed, reconstruction unit 310 may store reconstructed blocks to DPB 314. In examples where operations of filter unit 312 are needed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a device configured to decode video data including a memory configured to store video data, and one or more processing units implemented in circuitry and configured to store motion information for a first coding tree unit (CTU) line (which may be processed by a first thread of a video coding process) in a first history motion vector predictor (MVP) buffer of the memory, and store motion information for a second CTU line (which may be processed by a second thread of the video coding process) in a second history MVP buffer of the memory, the second CTU line being different than the first CTU line. The second thread may be different than the first thread.

Video decoder 300 also represents an example of a device configured to decode video data including a memory configured to store video data, and one or more processing units implemented in circuitry and configured to store coded motion information to a history motion vector predictor (MVP) buffer, store a different type of motion information to the history MVP buffer, and code motion information of a block of video data using motion information of the history MVP buffer.

Video decoder 300 also represents an example of a device configured to decode video data including a memory configured to store video data, and one or more processing units implemented in circuitry and configured to store a plurality of different types of motion information in respective, different history motion vector predictor (MVP) buffers.

Figure 16:
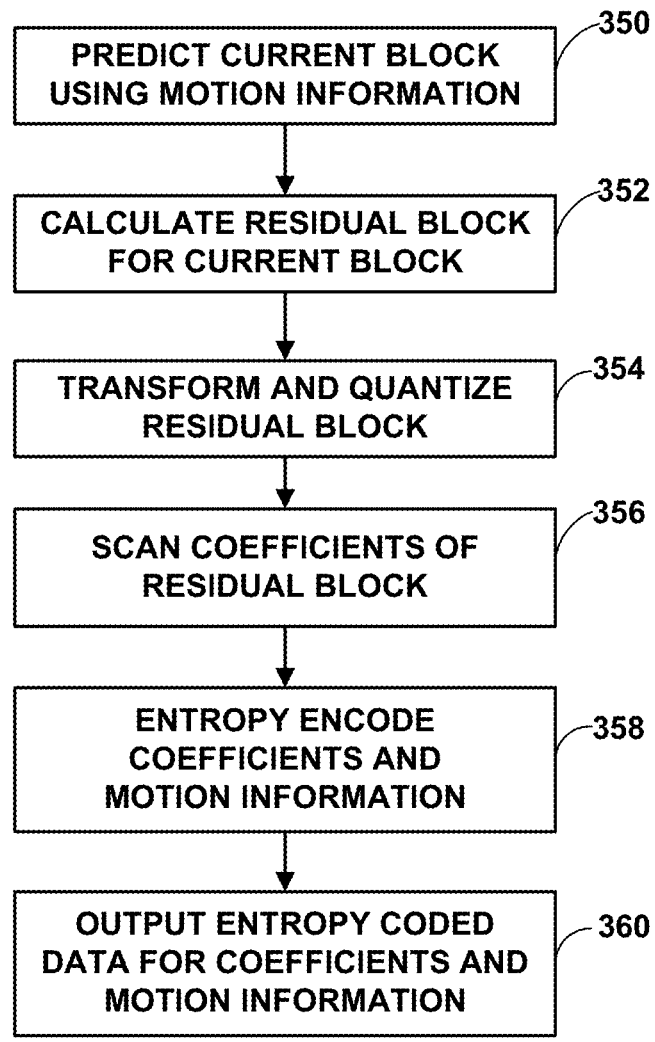
FIG. 16 is a flowchart illustrating an example method for encoding a current block of video data in accordance with the techniques of this disclosure.

FIG. 16 is a flowchart illustrating an example method for encoding a current block in accordance with the techniques of this disclosure. The current block may comprise a current CU. Although described with respect to video encoder 200 (FIGS. 1 and 14), it should be understood that other devices may be configured to perform a method similar to that of FIG. 16.

In this example, video encoder 200 initially predicts the current block using motion information (350). For example, video encoder 200 may form a prediction block for the current block using the motion information. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients and the motion information (358) using the techniques of this disclosure. Video encoder 200 may encode the coefficients using CAVLC or CABAC.

Video encoder 200 may construct a motion information candidate list including, e.g., HMVP candidates, according to any or all of the techniques of this disclosure, select a candidate index representing a predictor for the motion information of the block, and entropy encode the candidate index. In accordance with the techniques of this disclosure, video encoder 200 may reset an MVP buffer prior to using the MVP buffer to store motion information of a corresponding CTU line. In some examples, each CTU line may have its own MVP buffer, or one MVP buffer may be used for multiple CTU lines. Furthermore, video encoder 200 may store multiple types of motion information in MVP buffers, e.g., the same buffer or different respective motion model buffers. Video encoder 200 may encode motion information of a current block using motion vector predictors selected from data of the MVP buffer. Video encoder 200 may then output the entropy coded data of the block (360), e.g., including the data for the coefficients and the motion information, such as the candidate index.

In this manner, the method of FIG. 16 represents an example of a method including storing motion information for a first coding tree unit (CTU) line of a picture in a first history motion vector predictor (MVP) buffer of memory; resetting a second history MVP buffer of the memory; and after resetting the second history MVP buffer, storing motion information for a second CTU line of the picture in the second history MVP buffer, the second CTU line being different than the first CTU line.

The method of FIG. 16 also represents an example of a method including storing motion information to a history motion vector predictor (MVP) buffer; storing a different type of motion information to the history MVP buffer; and coding motion information of a block of video data using motion information of the history MVP buffer.

The method of FIG. 16 also represents an example of a method including storing a plurality of different types of motion information in respective, different history motion vector predictor (MVP) buffers.

Figure 17:
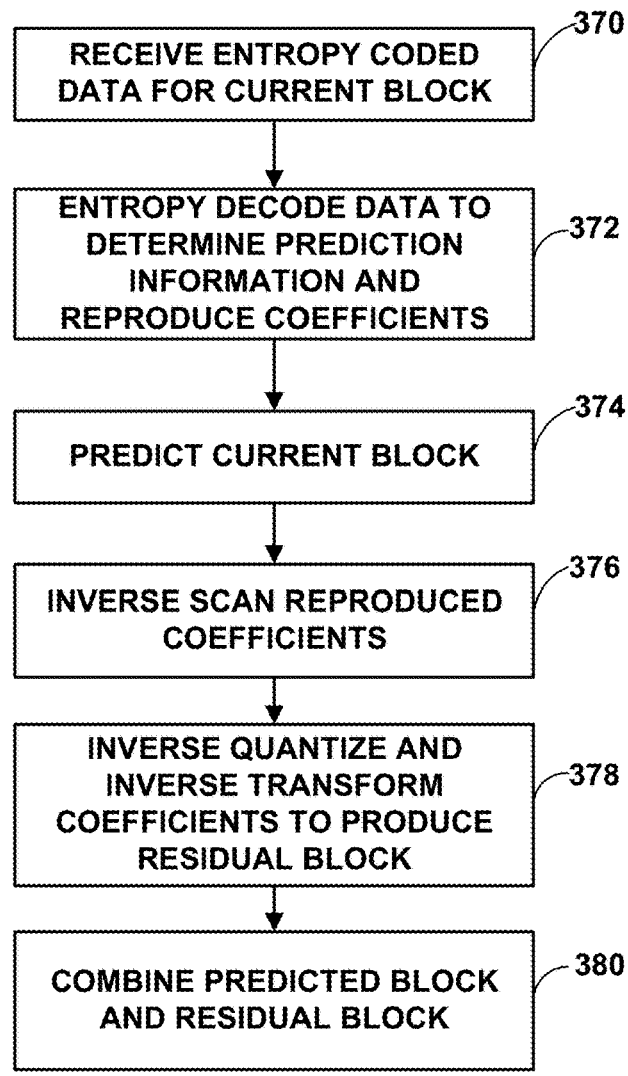
FIG. 17 is a flowchart illustrating an example method for decoding a current block of video data in accordance with the techniques of this disclosure.

FIG. 17 is a flowchart illustrating an example method for decoding a current block of video data in accordance with the techniques of this disclosure. The current block may comprise a current CU. Although described with respect to video decoder 300 (FIGS. 1 and 15), it should be understood that other devices may be configured to perform a method similar to that of FIG. 17.

Video decoder 300 may receive entropy coded data for the current block, such as entropy coded prediction information and entropy coded data for coefficients of a residual block corresponding to the current block (370). As discussed above, the entropy coded prediction information may include, for example, a candidate index into a candidate list, which may include HMVP candidates in accordance with the techniques of this disclosure. Video decoder 300 may entropy decode the entropy coded data to determine prediction information for the current block and to reproduce coefficients of the residual block (372). Video decoder 300 may predict the current block (374), e.g., using inter-prediction mode as indicated by the prediction information for the current block, to calculate a prediction block for the current block.

In particular, video decoder 300 may construct a candidate list including the HMVP candidates as discussed above, and then determine a candidate from the candidate list to use as a motion vector predictor for the current block using the decoded candidate index. In accordance with the techniques of this disclosure, video decoder 300 may reset an MVP buffer prior to using the MVP buffer to store motion information of a corresponding CTU line. In some examples, each CTU line may have its own MVP buffer, or one MVP buffer may be used for multiple CTU lines. Furthermore, video decoder 300 may store multiple types of motion information in MVP buffers, e.g., the same buffer or different respective motion model buffers. Video decoder 300 may select using motion vector predictors from data of the MVP buffer.

Video decoder 300 may then reconstruct a motion vector for the current block using the motion vector predictor, then predict the current block using the motion vector to generate a prediction block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 17 represents an example of a method including storing motion information for a first coding tree unit (CTU) line of a picture in a first history motion vector predictor (MVP) buffer of memory; resetting a second history MVP buffer of the memory; and after resetting the second history MVP buffer, storing motion information for a second CTU line of the picture in the second history MVP buffer, the second CTU line being different than the first CTU line.

The method of FIG. 17 also represents an example of a method including storing motion information to a history motion vector predictor (MVP) buffer; storing a different type of motion information to the history MVP buffer; and coding motion information of a block of video data using motion information of the history MVP buffer.

The method of FIG. 17 also represents an example of a method including storing a plurality of different types of motion information in respective, different history motion vector predictor (MVP) buffers.

Figure 18:
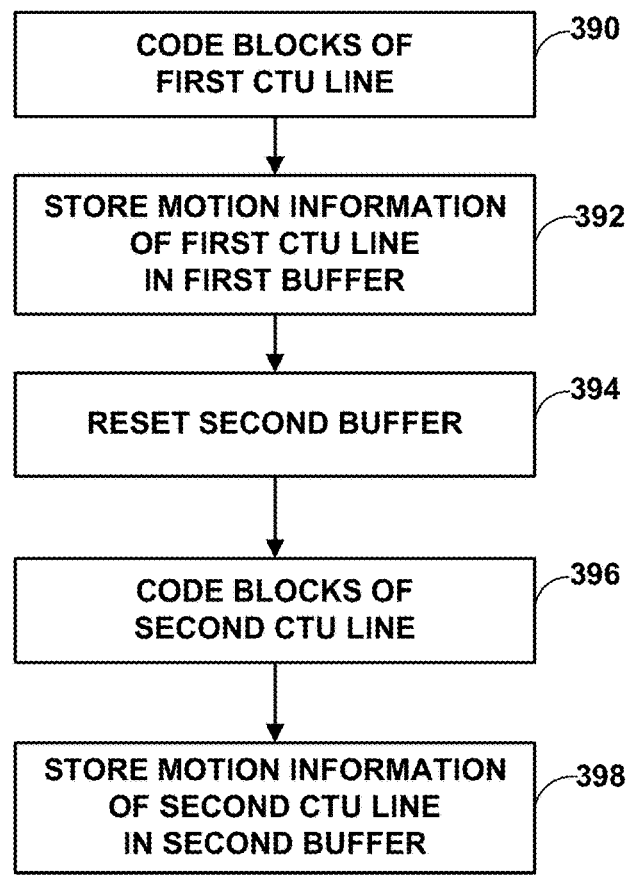
FIG. 18 is a flowchart illustrating an example method of coding (encoding or decoding) video data in accordance with the techniques of this disclosure.

FIG. 18 is a flowchart illustrating an example method of coding (encoding or decoding) video data in accordance with the techniques of this disclosure. For example, the method of FIG. 18 may be performed during step 350 of FIG. 16 or step 374 of FIG. 17. For purposes of example and explanation, the method of FIG. 18 is explained with respect to video decoder 300, although video encoder 200 may also perform this or a similar method.

Video decoder 300 may code blocks of a first CTU line of a picture (390), e.g., using intra- or inter-prediction. Video decoder 300 store motion information of a first coding tree unit (CTU) line of a picture in a first buffer (392), e.g., of DPB 314. Video decoder 300 may use the motion information of the first buffer to code motion information used during inter-prediction coding. In some examples, a first thread of a video coding process performed by video decoder 300 may code the first CTU line.

Video decoder 300 may also reset a second buffer (394), e.g., of DPB 314. The second buffer may be the same as the first buffer, or a different buffer. Video decoder 300 may also code blocks of a second CTU line (396). Video decoder 300 may store motion information of the second CTU line in the second buffer (398). In some examples, a second thread of the video coding process performed by video decoder 300 may code the second CTU line, where the second thread is different than the first thread.

In this manner, the method of FIG. 18 represents an example of a method including storing motion information for a first coding tree unit (CTU) line of a picture in a first history motion vector predictor (MVP) buffer of memory; resetting a second history MVP buffer of the memory; and after resetting the second history MVP buffer, storing motion information for a second CTU line of the picture in the second history MVP buffer, the second CTU line being different than the first CTU line.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   coding first motion information for a first line of coding structures of a picture, the first motion information for the first line of coding structures including a first at least one motion vector for the first line of coding structures;
   forming a first at least one prediction block for a first at least one coding structure of the first line using a first at least one reference block identified by the first at least one motion vector;
   coding a first at least one residual block for the first at least one coding structure, the first at least one residual block respectively representing a first at least one difference between the first at least one prediction block and the first at least one coding structure;
   storing the first motion information for the first line of coding structures of the picture in a first history motion vector predictor (MVP) buffer of a memory, including storing the first at least one motion vector for the first line of coding structures in the first history MVP buffer for use as a first at least one motion vector predictor to predict a first at least one other motion vector of the picture;
   resetting a second history MVP buffer of the memory;
   coding second motion information for a second line of coding structures of the picture, the second motion information for the second line of coding structures including a second at least one motion vector for the second line of coding structures;
   forming a second at least one prediction block for a second at least one coding structure of the second line using a second at least one reference block identified by the second at least one motion vector;
   coding a second at least one residual block for the second at least one coding structure, the second at least one residual block respectively representing a second at least one difference between the second at least one prediction block and the second at least one coding structure; and
   after resetting the second history MVP buffer, storing the second motion information for the second line of coding structures of the picture in the second history MVP buffer, the second line of coding structures being different than the first line of coding structures, including storing the second at least one motion vector for the second line of coding structures for use as a second at least one motion vector predictor to predict a second at least one other motion vector of the picture.

2. The method of claim 1, wherein the first line of coding structures has a length that is less than a full width of the picture.

3. The method of claim 1, wherein storing the first motion information for the first line of coding structures comprises storing the first motion information for a number of coding structures in the first line of coding structures that is less than a total number of coding structures in the first line of coding structures.

4. The method of claim 1, wherein the second history MVP buffer is different than the first history MVP buffer, wherein storing the first motion information for the first line of coding structures comprises storing, by a first thread of a video coding process, the first motion information for the first line of coding structures, and wherein storing the second motion information for the second line of coding structures comprises storing, by a second thread of the video coding process, the second motion information for the second line of coding structures, the first thread being different than the second thread.

5. The method of claim 1, wherein the second history MVP buffer is different than the first history MVP buffer, and wherein resetting the second history MVP buffer comprises resetting the second history MVP buffer in response to processing a beginning of the second line of coding structures.

6. The method of claim 1,
   wherein storing the first motion information for the first line of coding structures comprises storing only motion information unique within the first line of coding structures to the first history MVP buffer, and
   wherein storing the second motion information for the second line of coding structures comprises storing only motion information unique within the second line of coding structures to the second history MVP buffer.

7. The method of claim 1, further comprising:
when the first history MVP buffer becomes full, removing one or more oldest-inserted motion vectors from the first history MVP buffer according to a first-in-first-out (FIFO) rule; and
when the second history MVP buffer becomes full, removing one or more oldest-inserted motion vectors from the second history MVP buffer according to the FIFO rule.

8. The method of claim 1,
wherein storing the first motion information for the first line of coding structures comprises storing motion information for each of a plurality of different types of motion models to respective, different history MVP buffers of a first plurality of history MVP buffers including the first history MVP buffer; and
wherein storing the second motion information for the second line of coding structures comprises storing motion information for each of the plurality of different types of motion models to respective, different history MVP buffers of a second plurality of history MVP buffers including the second history MVP buffer.

9. The method of claim 1, further comprising generating a synthetic MVP from two or more MVPs in one or more history MVP buffers, wherein the two or more MVPs have different motion information types comprising two or more of coded motion information, affine motion model motion information, motion information of intra block copy mode, motion information of local illumination compensation, sub-block MVP motion information, temporal motion predictor motion information, synthetic motion vector information based on an MVP motion information, spatial MVP motion information, or temporal MVP motion information.

10. The method of claim 1, wherein the coding comprises decoding.

11. The method of claim 1, wherein the coding comprises encoding.

12. A device for coding video data, the device comprising:
a memory configured to store video data; and
one or more processors implemented in circuitry and configured to:
  code first motion information for a first line of coding structures of a picture, the first motion information for the first line of coding structures including a first at least one motion vector for the first line of coding structures;
  form a first at least one prediction block for a first at least one coding structure of the first line using a first at least one reference block identified by the first at least one motion vector;
  code a first at least one residual block for the first at least one coding structure, the first at least one residual block respectively representing a first at least one difference between the first at least one prediction block and the first at least one coding structure;
  store the first motion information for the first line of coding structures of the picture in a first history motion vector predictor (MVP) buffer of a memory, including storing the first at least one motion vector for the first line of coding structures in the first history MVP buffer for use as a first at least one motion vector predictor to predict a first at least one other motion vector of the picture;
  reset a second history MVP buffer of the memory;
  code second motion information for a second line of coding structures of the picture, the second motion information for the second line of coding structures including a second at least one motion vector for the second line of coding structures;
  form a second at least one prediction block for a second at least one coding structure of the second line using a second at least one reference block identified by the second at least one motion vector;
  code a second at least one residual block for the second at least one coding structure, the second at least one residual block respectively representing a second at least one difference between the second at least one prediction block and the second at least one coding structure; and
  after resetting the second history MVP buffer, store the second motion information for the second line of coding structures of the picture in the second history MVP buffer, the second line of coding structures being different than the first line of coding structures, including storing the second at least one motion vector for the second line of coding structures for use as a second at least one to predict a second at least one other motion vector of the picture.

13. The device of claim 12, wherein the first line of coding structures has a length that is less than a full width of the picture.

14. The device of claim 12, wherein the one or more processors are configured to store the first motion information for a number of coding structures in the first line of coding structures that is less than a total number of coding structures in the first line of coding structures.

15. The device of claim 12, wherein the second history MVP buffer is different than the first history MVP buffer, wherein to store the first motion information for the first line of coding structures, the one or more processors are configured to execute a first thread of a video coding process to store the first motion information for the first line of coding structures, and wherein to store the second motion information for the second line of coding structures, the one or more processors are configured to execute a second thread of the video coding process to store the second motion information for the second line of coding structures, the first thread being different than the second thread.

16. The device of claim 12, wherein the second history MVP buffer is different than the first history MVP buffer, and wherein to reset the second history MVP buffer, the one or more processors are configured to reset the second history MVP buffer in response to processing a beginning of the second line of coding structures.

17. The device of claim 12,
wherein to store the first motion information for the first line of coding structures, the one or more processors are configured to store only motion information unique within the first line of coding structures to the first history MVP buffer, and wherein to store the second motion information for the second line of coding structures, the one or more processors are configured to store only motion information unique within the second line of coding structures to the second history MVP buffer.

18. The device of claim 12, wherein the one or more processors are further configured to:
when the first history MVP buffer becomes full, remove one or more oldest-inserted motion vectors from the first history MVP buffer according to a first-in-first-out (FIFO) rule; and when the second history MVP buffer becomes full, remove one or more oldest-inserted motion vectors from the second history MVP buffer according to the FIFO rule.

19. The device of claim 12, further comprising a display configured to display the video data.

20. The device of claim 12, wherein the device comprises one or more of a camera, a computer, a mobile device, a broadcast receiver device, or a set-top box.

21. A computer-readable storage medium having stored thereon instructions that, when executed, cause a processor of a device for coding video data to:
code first motion information for a first line of coding structures of a picture, the first motion information for the first line of coding structures including a first at least one motion vector for the first line of coding structures;
form a first at least one prediction block for a first at least one coding structure of the first line using a first at least one reference block identified by the first at least one motion vector;
code a first at least one residual block for the first at least one coding structure, the first at least one residual block respectively representing a first at least one difference between the first at least one prediction block and the first at least one coding structure;
store the first motion information for the first line of coding structures of the picture in a first history motion vector predictor (MVP) buffer of a memory, including instructions that cause the processor to store the first at least one motion vector for the first line of coding structures in the first history MVP buffer for use as a first at least one motion vector predictor to predict a first at least one other motion vector of the picture;
reset a second history MVP buffer of the memory;
code second motion information for a second line of coding structures of the picture, the second motion information for the second line of coding structures including a second at least one motion vector for the second line of coding structures;
form a second at least one prediction block for a second at least one coding structure of the second line using a second at least one reference block identified by the second at least one motion vector;
code a second at least one residual block for the second at least one coding structure, the second at least one residual block respectively representing a second at least one difference between the second at least one prediction block and the second at least one coding structure; and
after resetting the second history MVP buffer, store the second motion information for the second line of coding structures of the picture in the second history MVP buffer, the second line of coding structures being different than the first line of coding structures, including instructions that cause the processor to store the second at least one motion vector for the second line of coding structures for use as a second at least one motion vector predictor to predict a second at least one other motion vector of the picture.

22. The computer-readable storage medium of claim 21, wherein the first line of coding structures has a length that is less than a full width of the picture.

23. The computer-readable storage medium of claim 21, wherein the instructions that cause the processor to store the first motion information include instructions that cause the processor to store the first motion information for a number of coding structures in the first line of coding structures that is less than a total number of coding structures in the first line of coding structures.

24. The computer-readable storage medium of claim 21, wherein the second history MVP buffer is different than the first history MVP buffer, wherein the instructions that cause the processor to store the first motion information for the first line of coding structures include instructions that cause the processor to execute a first thread of a video coding process to store the first motion information for the first line of coding structures, and wherein the instructions that cause the processor to store the second motion information for the second line of coding structures include instructions that cause the processor to execute a second thread of the video coding process to store the second motion information for the second line of coding structures, the first thread being different than the second thread.

25. The computer-readable storage medium of claim 21, wherein the second history MVP buffer is different than the first history MVP buffer, and wherein the instructions that cause the processor to reset the second history MVP buffer include instructions that cause the processor to reset the second history MVP buffer in response to processing a beginning of the second line of coding structures.

26. The computer-readable storage medium of claim 21, wherein the instructions that cause the processor to store the first motion information for the first line of coding structures include instructions that cause the processor to store only motion information unique within the first line of coding structures to the first history MVP buffer, and wherein the instructions that cause the processor to store the second motion information for the second line of coding structures include instructions that cause the processor to store only motion information unique within the second line of coding structures to the second history MVP buffer.

27. The computer-readable storage medium of claim 21, further comprising instructions that cause the processor to:
when the first history MVP buffer becomes full, remove one or more oldest-inserted motion vectors from the first history MVP buffer according to a first-in-first-out (FIFO) rule; and
when the second history MVP buffer becomes full, remove one or more oldest-inserted motion vectors from the second history MVP buffer according to the FIFO rule.

28. A device for coding video data, the device comprising:
means for coding first motion information for a first line of coding structures of a picture, the first motion information for the first line of coding structures including a first at least one motion vector for the first line of coding structures;
means forming a first at least one prediction block for a first at least one coding structure of the first line using a first at least one reference block identified by the first at least one motion vector;
means for coding a first at least one residual block for the first at least one coding structure, the first at least one residual block respectively representing a first at least one difference between the first at least one prediction block and the first at least one coding structure;
means for storing the first motion information for the first line of coding structures of the picture in a first history motion vector predictor (MVP) buffer of a memory, including means for storing the first at least one motion vector for the first line of coding structures in the first history MVP buffer for use as a first at least one motion vector predictor to predict a first at least one other motion vector of the picture;

means for resetting a second history MVP buffer of the memory;

means for coding second motion information for a second line of coding structures of the picture, the second motion information for the second line of coding structures including a second at least one motion vector for the second line of coding structures;

means for forming a second at least one prediction block for a second at least one coding structure of the second line using a second at least one reference block identified by the second at least one motion vector;

means for coding a second at least one residual block for the second at least one coding structure, the second at least one residual block respectively representing a second at least one difference between the second at least one prediction block and the second at least one coding structure; and means for storing the second motion information for the second line of coding structures of the picture in the second history MVP buffer after resetting the second history MVP buffer, the second line of coding structures being different than the first line of coding structures, including means for storing the second at least one motion vector for the second line of coding structures for use as a second at least one motion vector predictor to predict a second at least one other motion vector of the picture.

29. The device of claim 28, wherein the first line of coding structures has a length that is less than a full width of the picture.

30. The device of claim 28, wherein the means for storing the first motion information for the first line of coding structures comprises means for storing the first motion information for a number of coding structures in the first line of coding structures that is less than a total number of coding structures in the first line of coding structures.

\* \* \* \* \*